United States Patent
Takagi et al.

(10) Patent No.: US 10,500,593 B2
(45) Date of Patent: Dec. 10, 2019

(54) MANUFACTURING METHOD AND MANUFACTURING DEVICE FOR ANIMAL EXCREMENT TREATMENT MATERIAL

(71) Applicant: UNI-CHARM CORPORATION, Shikokuchuo-shi, Ehime (JP)

(72) Inventors: Chiyo Takagi, Kanonji (JP); Takeshi Ikegami, Kanonji (JP)

(73) Assignee: UNICHARM CORPORATION, Ehime (JP)

( * ) Notice: Subject to any disclaimer, the term of this patent is extended or adjusted under 35 U.S.C. 154(b) by 779 days.

(21) Appl. No.: 15/022,930

(22) PCT Filed: Aug. 4, 2014

(86) PCT No.: PCT/JP2014/070534
§ 371 (c)(1),
(2) Date: Mar. 18, 2016

(87) PCT Pub. No.: WO2015/002329
PCT Pub. Date: Jan. 8, 2015

(65) Prior Publication Data
US 2016/0227729 A1    Aug. 11, 2016

(30) Foreign Application Priority Data

Sep. 19, 2013 (JP) ................. 2013-194667

(51) Int. Cl.
*B02C 25/00* (2006.01)
*B02C 23/10* (2006.01)
(Continued)

(52) U.S. Cl.
CPC ............ *B02C 25/00* (2013.01); *A01K 1/0152* (2013.01); *B02C 23/08* (2013.01); *B02C 23/10* (2013.01); *B07B 1/42* (2013.01)

(58) Field of Classification Search
CPC .. A01K 1/0152; A01K 1/0154; A01K 1/0155; B02C 25/00; B02C 23/08; B02C 23/10
(Continued)

(56) References Cited

U.S. PATENT DOCUMENTS

2003/0209203 A1    11/2003 Opfel
2005/0230872 A1*   10/2005 Scobee .................... A23N 5/01
                                                                  264/141
(Continued)

FOREIGN PATENT DOCUMENTS

CN          1693198 A       11/2005
CN          102503211 A     6/2012
(Continued)

OTHER PUBLICATIONS

International Search Report dated Apr. 11, 2014, corresponding to International Application No. PCT/JP2014/070534.
(Continued)

*Primary Examiner* — Elaine Gort
*Assistant Examiner* — Christopher B Wehrly
(74) *Attorney, Agent, or Firm* — Hauptman Ham, LLP

(57) ABSTRACT

A manufacturing method for an animal excrement treatment material includes: a granulating step; a sorting step at which granules are sorted by a sieve to form an animal excrement treatment material; and a quality control step that includes an extracting step at which a sample is extracted, a comparison data calculating step at which the surface area per unit weight of the sample is obtained, and a sieve replacement step at which the sieve is replaced on the basis of the comparison data.

14 Claims, 21 Drawing Sheets

(51) Int. Cl.
  *B02C 23/08*   (2006.01)
  *A01K 1/015*   (2006.01)
  *B07B 1/42*    (2006.01)
(58) Field of Classification Search
  USPC ........................................................ 241/24.1
  See application file for complete search history.

(56) References Cited

U.S. PATENT DOCUMENTS

2012/0318205 A1    12/2012  Kuras et al.
2014/0108182 A1*   4/2014   Hoban .................. G06Q 10/06
                                               705/26.4

FOREIGN PATENT DOCUMENTS

JP    1-312945  A    12/1989
JP    2516060   B2    7/1996
JP    3288288   B2    6/2002

OTHER PUBLICATIONS

Office Action in CN Application No. 201480051453.5, dated Apr. 24, 2017.
Extended European Search Report in EP Application No. 14820286.4, dated Aug. 30, 2016.
Office Action in AU Application No. 2014284971, dated Apr. 4, 2017.
Written Opinion in International Patent Application No. PCT/JP2014/070534, dated Nov. 4, 2014.

* cited by examiner

//MANUFACTURING METHOD AND MANUFACTURING DEVICE FOR ANIMAL EXCREMENT TREATMENT MATERIAL

RELATED APPLICATIONS

The present application is a National Phase of International Application Number PCT/JP2014/070534, filed Aug. 4, 2014, which claims priority to Japanese Application Number 2013-194667, filed Sep. 19, 2013.

TECHNICAL FIELD

The present invention relates to a constructing technique for a method and a device for manufacturing animal excrement disposal materials.

BACKGROUND ART

Conventionally, various types of animal excrement disposal materials are provided for disposing of excrement of animals which are kept indoors. Accordingly, various types of methods for manufacturing animal excrement disposal materials are also provided. For example, Japanese Unexamined Patent Application Publication (JP-A) No. H1(1989)-312945 discloses a method for manufacturing animal excrement disposal materials in which a desired particle size is obtained by using a sieve.

Inventors of the present invention have made efforts for development of such technique and found out a further improved control technique using a sieve in a manufacturing process.

PRIOR ART DOCUMENT

Patent Document

JP H1(1989)-312945 A

SUMMARY OF THE INVENTION

Problem to be Solved by the Invention

Accordingly, it is an object of the present invention to provide a more rational constructing technique for a method and a device for manufacturing animal excrement disposal materials.

Means for Solving the Problem

In order to solve the above-described problem, according to a preferred aspect of the present invention, a method for manufacturing animal excrement disposal materials is provided which includes a granulating step of granulating a raw material into granules, and a sorting step of sorting the granules with a sieve having a prescribed mesh size to thereby obtain the animal excrement disposal materials.

The manufacturing method further includes a quality control step using quality control equipment. The quality control step includes an extracting step of extracting a sample to be measured from the animal excrement disposal materials, a comparison data calculating step of obtaining a surface area per unit weight of the sample as comparison data, and a sieve replacing step of replacing the sieve based on the comparison data.

With this structure, the appropriate sieve can be provided based on the surface area per unit weight of the sample. Therefore, according to this manufacturing method, animal excrement disposal materials having stable quality can be manufactured.

In a further aspect of the manufacturing method according to the present invention, a surface area per unit weight of a prescribed numerical value is provided as reference data in the quality control step, and the quality control step includes a comparing step of comparing the comparison data with the reference data.

With this structure, whether the sieve is appropriate or not can be automatically determined by comparing the surface area per unit weight with the reference data.

In a further aspect of the manufacturing method according to the present invention, the sieve includes a current sieve being in use in the sorting step and a standby sieve having a different mesh size from the current sieve. In this case, the current sieve can be replaced with the standby sieve in the sieve replacing step.

In order to solve the above-described problem, according to a preferred aspect of the present invention, a method for manufacturing animal excrement disposal materials is provided which includes a granulating step of granulating a raw material into granules, and a sorting step of sorting the granules with a sieve having a prescribed mesh size to thereby obtain the animal excrement disposal materials.

The method further includes a quality control step using quality control equipment. The quality control step includes an extracting step of extracting a sample to be measured from the animal excrement disposal materials, a comparison data calculating step of obtaining a surface area of the sample as comparison data, and a sieve replacing step of replacing the sieve based on the comparison data.

With this structure, the appropriate sieve can be provided based on the surface area of the sample. Therefore, according to this manufacturing method, animal excrement disposal materials having stable quality can be manufactured.

In a further aspect of the manufacturing method according to the present invention, a surface area of a prescribed numerical value is provided as reference data in the quality control step, and the quality control step includes a comparing step of comparing the comparison data with the reference data.

With this structure, whether the sieve is appropriate or not can be automatically determined by comparing the surface area with the reference data.

In a further aspect of the manufacturing method according to the present invention, the sieve includes a current sieve being in use in the sorting step and a standby sieve having a different mesh size from the current sieve. In this case, the current sieve can be replaced with the standby sieve in the sieve replacing step.

In order to solve the above-described problem, according to a preferred aspect of the present invention, a device for manufacturing animal excrement disposal materials is provided which includes a granulating part for granulating a raw material into granules, and a sorting part for sorting the granules with a sieve having a prescribed mesh size to thereby obtain the animal excrement disposal materials.

The manufacturing device further includes a quality control part using quality control equipment. The quality control part includes an extracting part for extracting a sample to be measured from the animal excrement disposal materials, a comparison data calculating part for obtaining a surface area per unit weight of the sample as comparison data and a sieve replacing part for replacing the sieve based on the comparison data.

With this structure, the appropriate sieve can be provided based on the surface area per unit weight of the sample. Therefore, according to this manufacturing device, the animal excrement disposal materials having stable quality can be manufactured.

In order to solve the above-described problem, according to a preferred aspect of the present invention, a device for manufacturing animal excrement disposal materials is provided which includes a granulating part for granulating a raw material into granules, and a sorting part for sorting the granules with a sieve having a prescribed mesh size to thereby obtain the animal excrement disposal materials.

The manufacturing device further includes a quality control part using quality control equipment. The quality control part includes an extracting part for extracting a sample to be measured from the animal excrement disposal materials, a comparison data calculating part for obtaining a surface area of the sample as comparison data and a sieve replacing part for replacing the sieve based on the comparison data.

With this structure, the appropriate sieve can be provided based on the surface area of the sample. Therefore, according to this manufacturing method, the animal excrement disposal materials having stable quality can be manufactured.

Effect of the Invention

According to the present invention, a more rational constructing technique for a method and a device for manufacturing animal excrement disposal materials can be provided.

REPRESENTATIVE EMBODIMENT OF THE INVENTION

A method for manufacturing animal excrement disposal materials according to the present invention is now explained with reference to FIGS. 1 to 36. The "animal" in an embodiment of this invention widely includes vertebrates (mammals, reptiles, birds and amphibians) and invertebrates, and typically represents pets such as cats, dogs, rabbits and hamsters. The animal excrement disposal materials according to the present invention are especially suitable for cats which are kept indoors.

(General Basic Embodiment)

A general basic embodiment of a method and a device for manufacturing animal excrement disposal materials according to the present invention is explained with reference to FIGS. 1 to 8. Further, manufacturing methods and devices which are explained in the general basic embodiment with reference to FIGS. 1 to 8 are appropriately applied to methods and devices for manufacturing animal excrement disposal materials according to first to 14th embodiment patterns which are described below with reference to FIGS. 9 to 36.

(Animal Excrement Disposal Materials C100)

Figure 1:
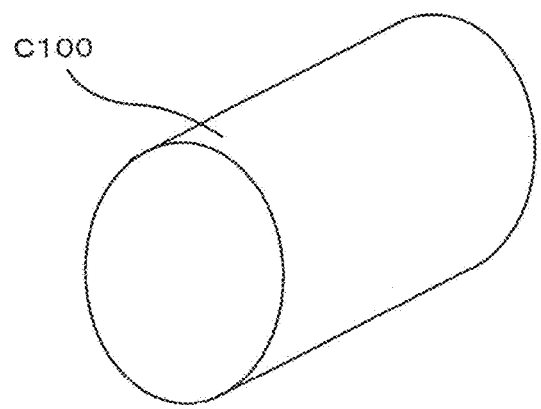
FIG. 1 is an explanatory drawing showing an animal excrement disposal material according to the present invention.

FIG. 1 is a perspective view schematically showing an animal excrement disposal material C100. In the method and device for manufacturing animal excrement disposal materials according to the present invention, various kinds of known animal excrement disposal materials C100 can be appropriately manufactured. The known animal excrement disposal materials C100 here refer to those capable of absorbing animal excrement, those capable of absorbing animal excrement and exhibiting viscosity, thereby being bonded to each other, and those to be used in combination with a sheet-like absorbent member. The "excrement" used herein widely includes not only urine but body fluids such as saliva and menstrual blood.

Therefore, the shape and materials of the animal excrement disposal materials C100 can be appropriately selected from those of known structures. For example, although the animal excrement disposal material C100 shown in FIG. 1 has a cylindrical shape, various other shapes such as spherical, elliptical, or polygonal columnar shape can be selected. Further, some of the animal excrement disposal materials C100 such as those manufactured by pulverizing bentonite do not have a definite shape.

The animal excrement disposal material C100 is an example embodiment that corresponds to the "animal excrement disposal material" according to the present invention.

(First Manufacturing Device A1)

Figure 2:
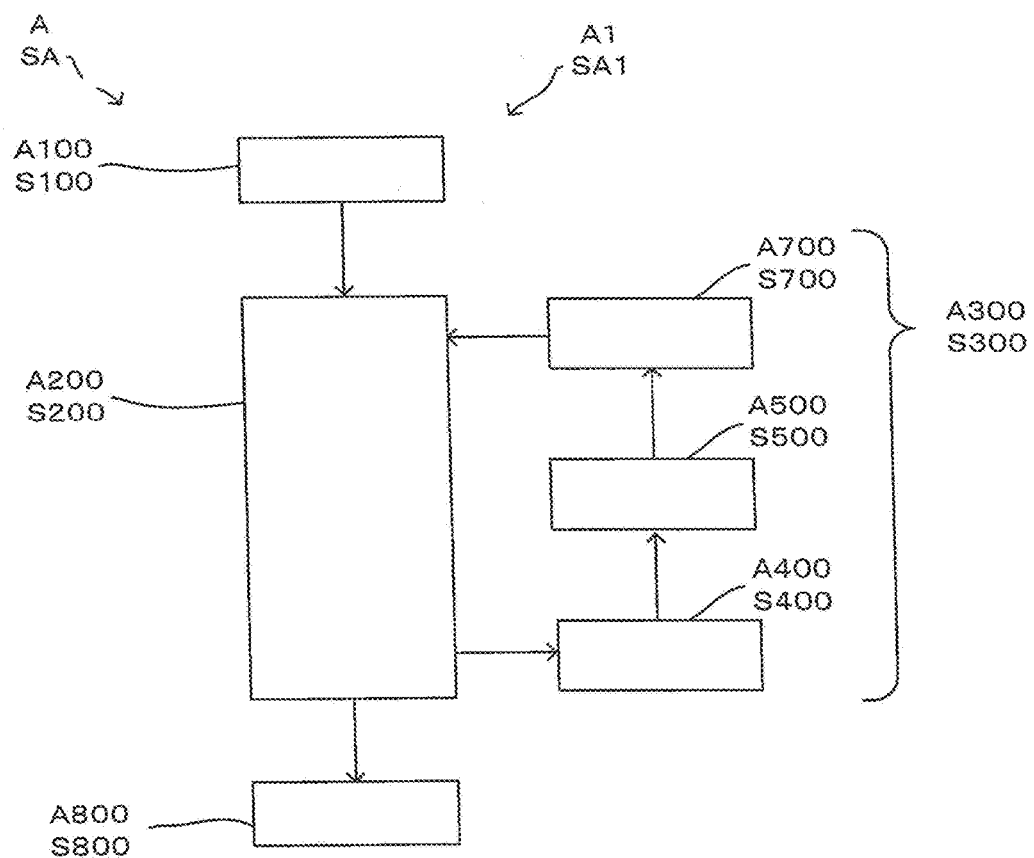
FIG. 2 is a block diagram showing a first manufacturing device according to a general basic embodiment of the present invention.

A manufacturing device A for animal excrement disposal materials performs a manufacturing method SA for animal excrement disposal materials according to this invention. FIG. 2 shows a first manufacturing device A1 for performing a first manufacturing method SA1. The first manufacturing device A1 has a granulating part A100 and a sorting part A200. The granulating part A100 performs a granulating step S100 and the sorting part A200 performs a sorting step S200.

The manufacturing method SA and device A for animal excrement disposal materials are example embodiments that correspond to the "method for manufacturing animal excrement disposal materials" and the "device for manufacturing animal excrement disposal materials", respectively, according to the present invention.

In the granulating part A100, granules are obtained from a raw material. A known step can be appropriately applied as the granulating step S100 in the manufacturing method for the animal excrement disposal materials C100. Specifically, in the granulating step S100, the raw material itself may be processed. In such a case, the granulating step S100 has a step of pulverizing the raw material, a step of kneading the pulverized raw material after adding liquid such as water, and a step of granulating into a prescribed shape. At this time, when using a preliminarily pulverized raw material, the step of pulverizing the raw material can be omitted.

The step of granulating the raw material into a prescribed shape may include a process of cutting the raw material extruded by an extruder into a prescribed length, a process of forming the raw material into a prescribed shape by a tableting machine and a process of forming the raw material into a prescribed shape within a rotating drum by rotation of the rotating drum.

Further, in the granulating step S100, when the main raw material is bentonite, granules can be formed by pulverizing bentonite ore, for example, with a Raymond mill and then chamfering.

A desired function may be imparted to the granules. In such a case, powder or liquid having the desired function is applied to the granules. The granulating step S100 includes such processing to which the granules formed into a prescribed shape are subjected.

The granulating part A100, the granulating step S100 and the granule are example embodiments that correspond to the "granulating part", the "granulating step" and the "granule", respectively, according to the present invention.

The granules obtained in the granulating part A100 are sorted in the sorting part A200 based on a prescribed size. A granule which is determined to have the prescribed size in the sorting step S200 of the sorting part 200A forms the animal excrement disposal material C100. In the sorting step S200, a sieve B100 which is described below is used to sort the granules based on the size. A granule which is determined not to be appropriate (in size) in the sorting step S200 is returned to the granulating step S100. The sorting part A200 and the sorting step S200 are example embodiments that correspond to the "sorting part" and the "sorting step", respectively, according to the present invention.

Further, in the manufacturing device A and the manufacturing process SA according to the present invention, it is determined whether the sieve B100 is appropriate (for use) or not, and when determined to be inappropriate, the sieve B100 is replaced. The inappropriate sieve B100 includes the sieve B100 which is broken or clogged.

After passing through the sorting part A200, the animal excrement disposal materials C100 are transferred to a final processing part A800. In the final processing part A800, a final processing step S800 including all of processes following the sorting step S200 are performed. Specifically, the final processing step S800 includes a process of filling containers with the animal excrement disposal materials C100 and a process of packing a plurality of the containers filled with the animal excrement disposal materials C100 in each cardboard box for delivery. Further, the animal excrement disposal materials C100 passed through the sorting part A200 may be subjected to further processing. Such further processing is also included in the final processing step S800 according to this invention.

The sorting part A200 has a quality control part A300. In the quality control part A300, a quality control step S300 is performed to determine whether the sieve B100 in the sorting step S200 is appropriate or not.

The quality control part A300 has an extracting part A400, a comparison data calculating part A500 and a sieve replacing part A700. The extracting part A400, the comparison data calculating part A500 and the sieve replacing part A700 perform an extracting step S400, a comparison data calculating step S500 and a sieve replacing step S700, respectively. Further, equipment which is used in the extracting part A400, the comparison data calculating part A500 and the sieve replacing part A700 is referred to as quality control equipment.

The quality control part A300, the quality control step S300 and the quality control equipment are example embodiments that correspond to the "quality control part", the "quality control step" and the "quality control equipment", respectively, according to the present invention.

The extracting part A400 extracts a sample (not shown) to be measured from part of the animal excrement disposal materials C100 passed through the sorting part A200. The comparison data calculating part A500 calculates comparison data from a unit numerical value obtained by measuring the sample. In the sieve replacing part A700, the sieve B100 is replaced based on the comparison result.

Further, specific examples of the comparison data are described below in the first to 13th embodiment patterns with reference to FIGS. 9 to 34.

The extracting part A400, the comparison data calculating part A500, the sieve replacing part A700, the extracting step S400, the comparison data calculating step S500 and the sieve replacing step S700 are example embodiments that correspond to the "extracting part", the "comparison data calculating part", the "sieve replacing part", the "extracting step", the "comparison data calculating step" and the "sieve replacing step", respectively, according to the present invention.

In the sieve replacing step S700, various kinds of operations for replacement of the sieve can be selected. For example, a display part may be provided to display the comparison data by characters, figures or symbols, or a sound generating part may be provided to transmit the comparison data by sound.

In this case, an operator can determine from the comparison data whether the sieve B100 of the sorting part A200 is appropriate or not. When the operator determines that the sieve B100 of the sorting part A200 is not appropriate, the operator can replace the sieve B100 with another sieve B100.

Thus, in the first manufacturing device A1, the sorting part A200 can be provided with the appropriate sieve B100. Therefore, the first manufacturing device A1 can provide the animal excrement disposal materials C100 having stable quality.

(Second Manufacturing Device A2)

The quality control part A300 may also be configured to automatically determine whether the sieve B100 of the sorting part A200 is appropriate or not.

Figure 3:
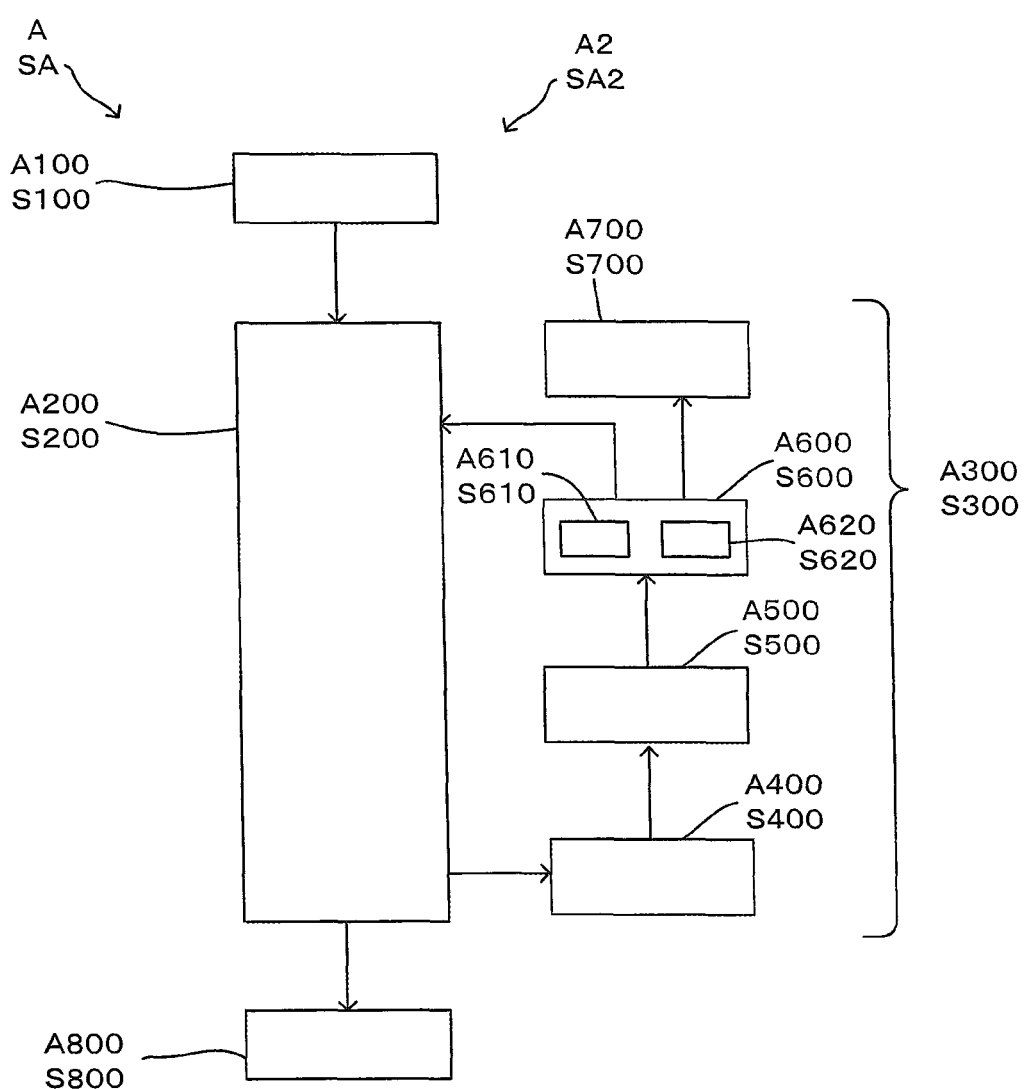
FIG. 3 is a block diagram showing a second manufacturing device according to the general basic embodiment.

An example of such a manufacturing device A is explained with reference to FIG. 3. A second manufacturing device A2 shown in FIG. 3 has a comparison part A600 in a step following the step of the comparison data calculating part A500. The comparison part A600 has a reference data storage part A620 and a comparison operation part A610.

The second manufacturing device A2 performs a second manufacturing method SA2. The comparison part A600, the reference data storage part A620 and the comparison operation part A610 perform a comparing step S600, a reference data storing step S620 and a comparison operation step S610, respectively.

The comparison part A600 is an example embodiment that corresponds to the "comparison part" according to the present invention.

In the reference data storage part A620 of the comparison part A600, reference date of a prescribed numerical value for determining whether the comparison data is appropriate or not is stored.

Further, examples of the reference data are described below in the first to 13th embodiment patterns with reference to FIGS. 9 to 34.

The comparison operation part A610 compares the comparison data and the reference data and determines whether the comparison data is appropriate or not.

When the comparison part A600 determines that the comparison data is appropriate, it means that the sieve B100 of the sorting part A200 is appropriate. Therefore, the quality control part A300 performs the quality control step S300 based on the next sample.

On the other hand, when the comparison part A600 determines that the comparison data is not appropriate, it means that the sieve B100 of the sorting part A200 is not appropriate.

In the sieve replacing part A700, the sieve B100 is replaced based on the information from the comparison part A600.

In the sieve replacing step A700 of the second manufacturing device A2, various kinds of operations for replacement of the sieve can be selected. For example, a display part may be provided to display the information indicating that "the sieve B100 of the sorting part A200 is not appropriate" by characters, figures or symbols, or a sound generating part may be provided to transmit the information indicating that "the sieve B100 of the sorting part A200 is not appropriate" by sound.

Further, as described below, based on the result of the comparison between the comparison data and the reference data, information indicating that "the sieve B100 of the sorting part A200 is to be replaced with a sieve B100 having a larger mesh size" or "the sieve B100 of the sorting part A200 is to be replaced with a sieve B100 having a smaller mesh size" may be transmitted.

Alternatively, a device for automatically replacing the sieve B100 of the sorting part A200 with another sieve B100 may be used.

Thus, in the second manufacturing device A2, the sorting part A200 can be provided with the appropriate sieve B100. Therefore, the second manufacturing device A2 can provide the animal excrement disposal materials C100 having stable quality.

(Comparison Data Calculating Part A500)

Figure 4:
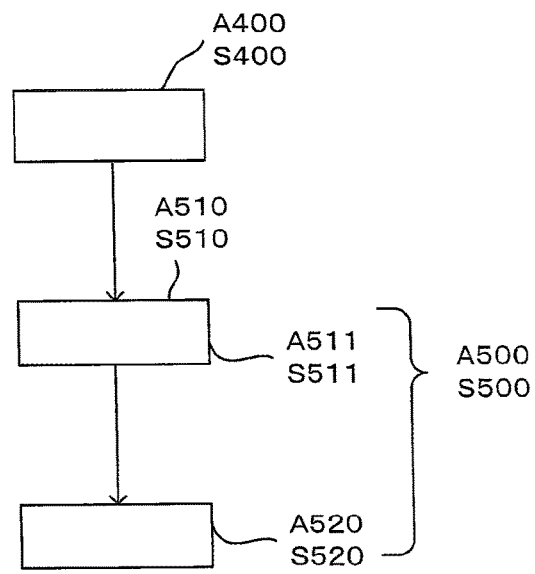
FIG. 4 is a block diagram relating to a first comparison data calculating device of the present invention.
Figure 5:
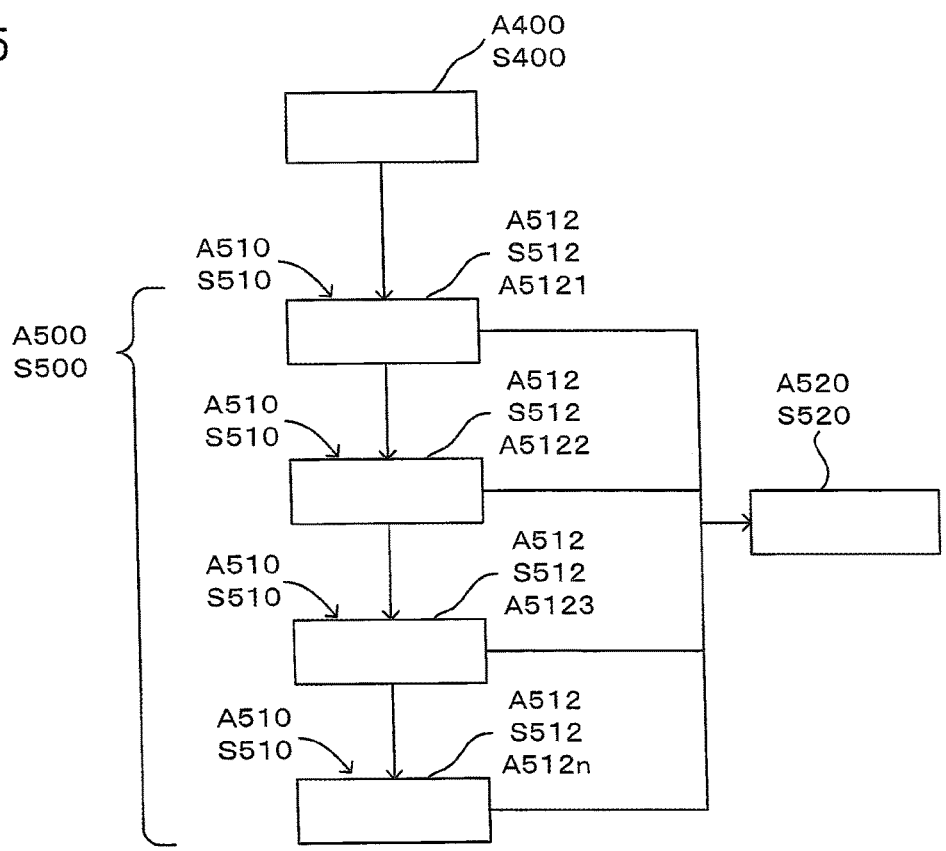
FIG. 5 is a block diagram relating to a second comparison data calculating device of the present invention.

A specific structure of the comparison data calculating part A500 for obtaining the comparison data from the sample is explained with reference to FIGS. 4 and 5.

The comparison data calculating part A500 has a unit numerical value measuring part A510 that measures the sample with quality control equipment to obtain a unit numerical value of the sample, and a comparison data operation part A520 that obtains the comparison data based on the unit numerical value obtained from the unit numerical value measuring part A510. The comparison data calculating part A500, the unit numerical value measuring part A510 and the comparison data operation part A520 perform a comparison data calculating step S500, a unit numerical value measuring step S510 and a comparison data operation step S520, respectively.

In the present invention, the unit numerical value refers to a unit numerical value which can be obtained by the quality control equipment. The specific unit numerical value includes size (particle size) and weight. Further, examples of the comparison data which can be obtained by operating the unit numerical value include a surface area and a volume which are calculated from the size (particle size), a mass (weight) which is obtained from the volume and a specific gravity inputted by the operator, a surface area per unit weight which is obtained from the surface area and the weight, a volume per unit weight which is obtained from the volume and the weight, and standard deviations thereof.

An example of the comparison data calculating part A500 is explained with reference to FIG. 4. The comparison data calculating part A500 has a first unit numerical value measuring part A511 as the unit numerical value measuring part A510. The first unit numerical value measuring part A511 performs a first unit numerical value measuring step S511.

As the quality control equipment in the first unit numerical value measuring step S511, a device which is capable of measuring a desired unit numerical value is used. For example, when it is desired to obtain the particle size of the sample as a unit numerical value, a digital image analysis type particle size distribution measuring device FPA (manufactured by Nihon Rufuto Corporation) may be used. When it is desired to obtain the weight of the sample as a unit numerical value, a weigher may be used.

Other quality control equipment may also be used as the comparison data calculating part A500. For example, in FIG. 5, a second unit numerical value measuring part A512 is used as the unit numerical value measuring part A510. The second unit numerical value measuring part A512 performs a second unit value measuring step S512 and obtains the particle size of the sample as the unit numerical value.

The second unit numerical value measuring part A512 uses a plurality of measuring sieves as the quality control equipment. The measuring sieves are different in mesh size. The measuring sieves are referred to as a first measuring sieve A5121, a second measuring sieve A5122, a third measuring sieve A5123 and an n-th measuring sieve A512$n$ in descending order of the mesh size. Further, the number n of the measuring sieves (the value of n) is sufficient to be about ten, but it is preferable to provide a larger value of n (a larger number of sieves) for accurate calculation.

A plurality of samples are transferred from the extracting part A400 to the second unit numerical value measuring part A512. The samples are passed through the measuring sieves in order from one measuring sieve having a larger mesh size to another having a smaller mesh size and thus sorted by the size.

At this time, a sample left on the first measuring sieve A5121 having the largest mesh size is considered as having a particle size equal to the mesh size of the first measuring sieve A5121. Specifically, when the first measuring sieve A5121 has the mesh size of 2.8 mm, the particle size of the sample left on the first measuring sieve A5121 is taken as 2.8 mm.

In this manner, when no other measuring sieve having a larger mesh size than the measuring sieve (the current measuring sieve) on which the sample is left exists on the upstream side of the current measuring sieve, the mesh size of the current measuring sieve is taken as the particle size of the sample on the measuring sieve.

Next, the particle size of a sample left on the second measuring sieve A5122 is calculated. In this case, an average value of the mesh sizes of the first measuring sieve A5121 and the second measuring sieve A5122 is considered as the particle size of the sample. Specifically, when the mesh size of the second measuring sieve A5122 is 2.0 mm, and the mesh size of the first measuring sieve A5121 is 2.8 mm, the particle size of the sample left on the second measuring sieve A5122 is taken as 2.4 mm.

In this manner, when another measuring sieve having a larger mesh size than the current measuring sieve exists on the upstream side of the current measuring sieve, the average value of the mesh sizes of these measuring sieves is considered as the particle size of the sample. For another example, when the mesh size of the second measuring sieve A5122 is 2.0 mm, and the mesh size of the third measuring sieve A5123 is 1.7 mm, the particle size of a sample left on the third measuring sieve A5123 is taken as 1.85 mm which is an average value of the mesh sizes of the second measuring sieve A5122 and the third measuring sieve A5123.

Further, the particle size of a sample passed through the final n-th measuring sieve A512$n$ is considered as being half the mesh size of the n-th measuring sieve A512$n$.

In this manner, a particle size of a sample can be obtained as the unit numerical value of the sample.

(Sieve Replacing part A700)

Figure 6:
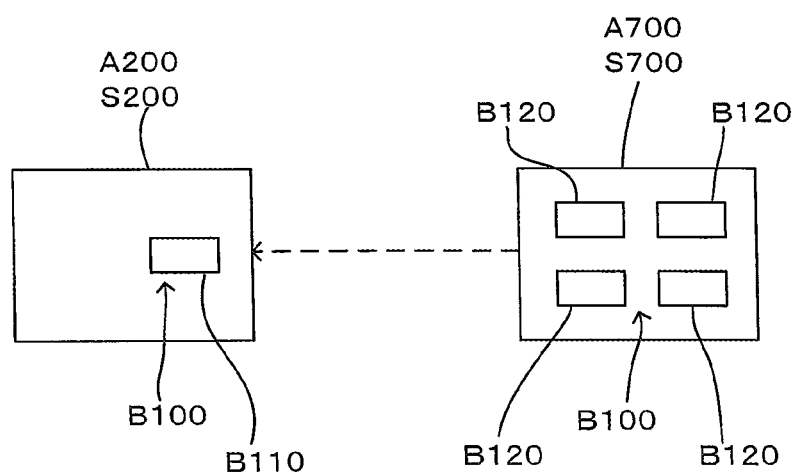
FIG. 6 is a block diagram relating to a replacing device of the present invention.

An outline of the sieve replacing part A700 is explained with reference to FIG. 6. FIG. 6 is an explanatory drawing showing a relation between the sorting part A200 and the sieve replacing part A700. As described above, in the sorting part A200, the sieve B100 is used. The sieve B100 includes a current sieve B110 in use in the sorting part A200 and a standby sieve B120 prepared in the sieve replacing part A700. The standby sieve B120 has a different mesh size from the current sieve B110. Any number of (one or more) standby sieves B120 can be prepared in the sieve replacing part A700. In FIG. 6, four standby sieves B120 are prepared.

The sieve B100, the current sieve B110 and the standby sieve B120 are example embodiments that correspond to the "sieve", the "current sieve" and the "standby sieve", respectively, according to the present invention.

As described above, the standby sieve B120 and the current sieve B110 are different in mesh size. The standby sieve B120 and the current sieve B110 "different in mesh size" here include those different in mesh size specification. Further, when broken or clogged, the current sieve B110 cannot function according to the specification. Therefore, in such a case, even if the current sieve B110 and the standby sieve B120 have the same mesh size specification, they are considered as having different mesh sizes.

(Third Manufacturing Device A3)

The manufacturing device A according to the present invention can improve the quality of the animal excrement disposal materials C100 by replacing the current sieve B110 with the standby sieve B120. Therefore, a new manufacturing process can be obtained by focusing on a specific effect of the manufacturing process A100 according to the present invention.

For example, user friendliness of the animal excrement disposal materials C100 may be improved by mixing the animal excrement disposal materials C100 having different unit numerical values.

Naturally, the aggregate of the animal excrement disposal materials C100 having different unit numerical values has to satisfy desired constant quality. This "constant quality" can be obtained, for example, by mixing the animal excrement disposal materials C100 satisfying one reference data with the animal excrement disposal materials C100 satisfying another reference data in a prescribed ratio.

Further, the animal excrement disposal materials C100 satisfying one reference data and the animal excrement disposal materials C100 satisfying another reference data may be formed of the same raw material or of different raw materials.

According to the present invention, the mesh size of the sieve B100 and the reference data of the animal excrement disposal materials C100 to be manufactured can be associated with each other. In other words, the animal excrement disposal materials C100 satisfying different reference data can be associated with the respective sieves B100 having different mesh sizes.

Methods for manufacturing the animal excrement disposal materials C100 by using a plurality of the current sieves B110 are described below with reference to FIGS. 7 and 8.

As the manufacturing device A for manufacturing animal excrement disposal materials according to the present invention, a third manufacturing device A3 is explained with reference to FIG. 7. The third manufacturing device A3 performs a third manufacturing method SA3.

The third manufacturing device A3 has a plurality of granulating parts A100, a plurality of sorting parts A200 and a plurality of quality control parts A300. The granulating parts A100, the sorting parts A200 and the quality control parts A300 are simultaneously operated.

Figure 7:
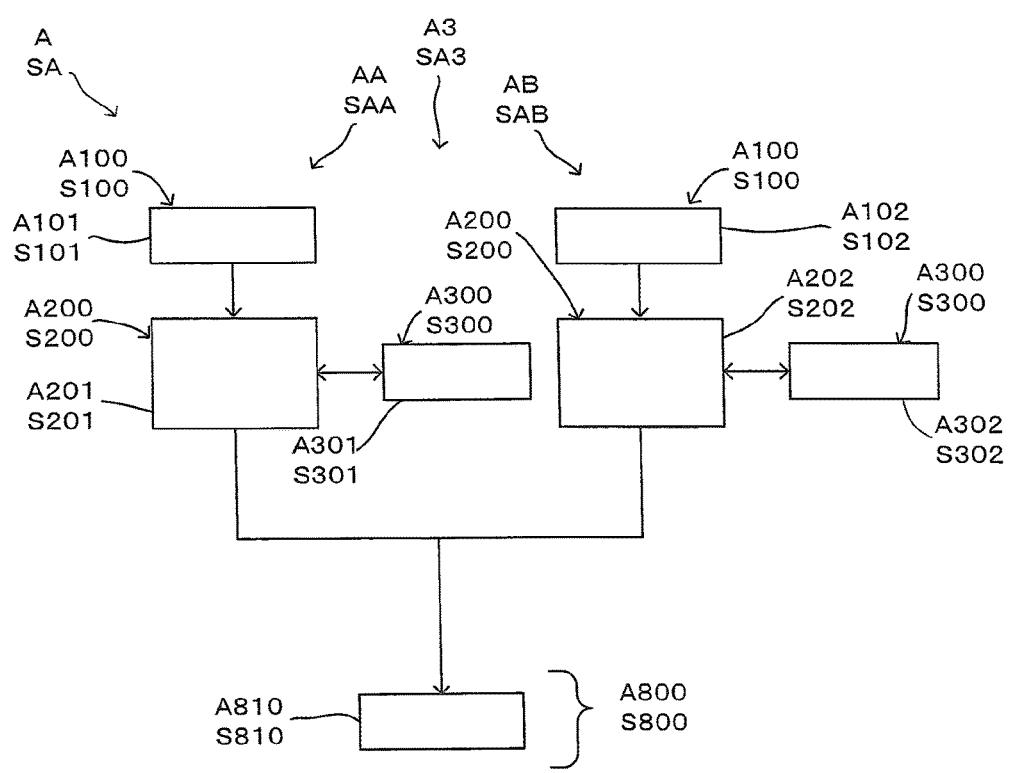
FIG. 7 is a block diagram showing a third manufacturing device according to the general basic embodiment of the present invention.
Figure 8:
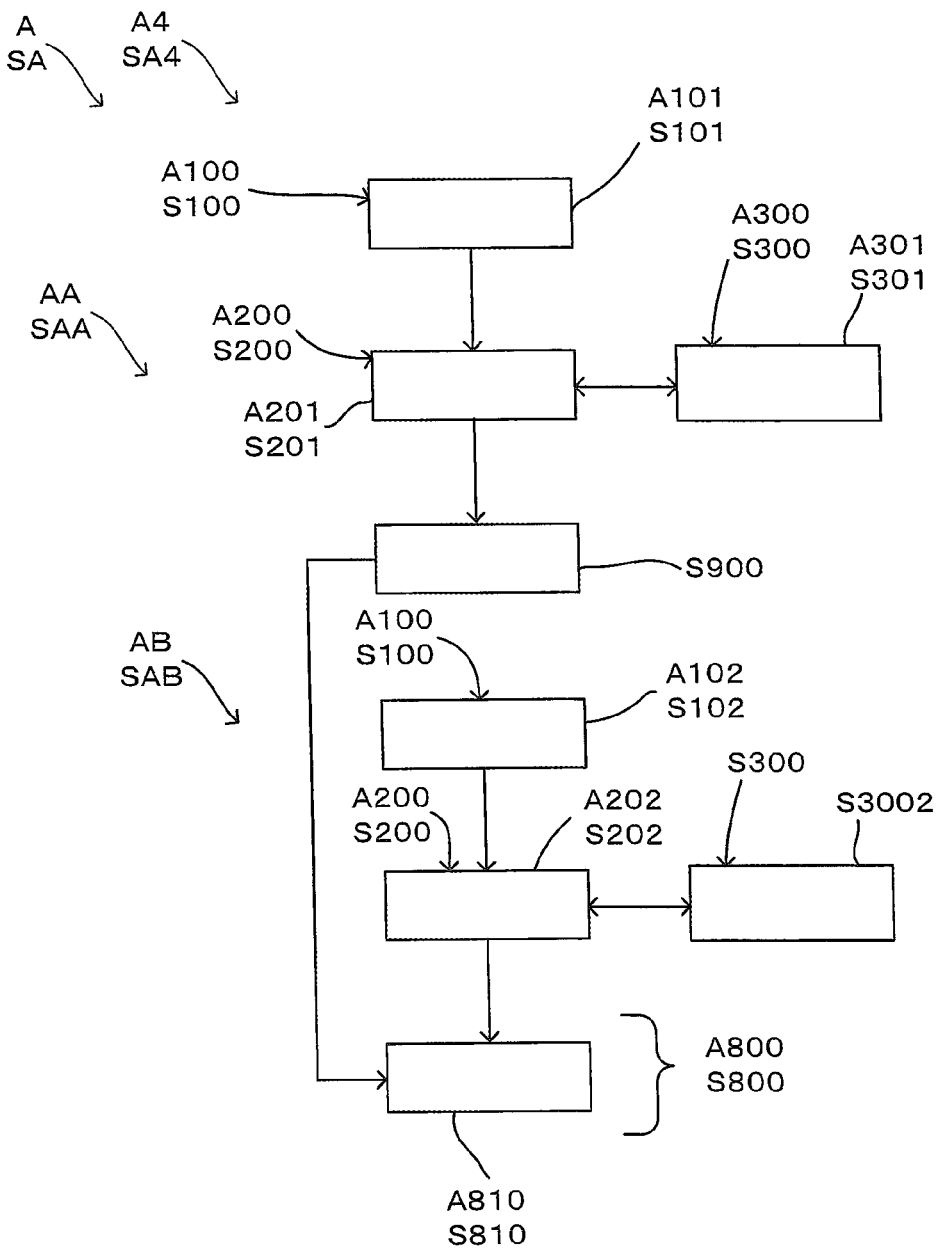
FIG. 8 is a block diagram showing a fourth manufacturing device according to the general basic embodiment.

Specifically, in FIG. 7, the third manufacturing device A3 has a first granulating part A101 and a second granulating part A102 as the granulating parts A100, a first sorting part A201 and a second sorting part A202 as the sorting parts A200, and a first quality control part A301 and a second quality control part A302 as the quality control parts A300.

Granules which are formed in the first granulating part A101 are sorted in the first sorting part A201. A granule obtained in the first sorting part A201 forms a first animal excrement disposal material (not shown). The first quality control part A301 determines based on the first animal excrement disposal material whether the current sieve B110 in the first sorting part A201 is appropriate or not. In the present invention, the first granulating part A101, the first sorting part A201 and the first quality control part A301 are referred to as a first granule obtaining part AA. The first granule obtaining part AA performs a first granule obtaining step SAA.

Granules which are formed in the second granulating part A102 are sorted in the second sorting part A202. A granule obtained in the second sorting part A202 forms a second animal excrement disposal material (not shown). The second quality control part A302 determines based on the second animal excrement disposal material whether the current sieve B110 in the second sorting part A202 is appropriate or not. In the present invention, the second granulating part A102, the second sorting part A202 and the second quality control part A302 are referred to as a second granule obtaining part AB. The second granule obtaining part AB performs a second granule obtaining step SAB.

The current sieves B110 in the first and second sorting parts A201, A202 have different mesh sizes. The current sieve B110 in the first sorting part A201 and the current sieve B110 in the second sorting part A202 are defined as a first current sieve (not shown) and a second current sieve (not shown), respectively.

The first and second animal excrement disposal materials are transferred to the final processing part A800. The final processing part A800 has a mixing part A810 for mixing the first animal excrement disposal materials and the second animal excrement disposal materials in a prescribed ratio. The mixing part A810 performs a mixing step S810.

In this manner, a product in which the animal excrement disposal materials C100 satisfying different reference data are mixed together in a prescribed ratio can be provided with constant quality.

(Fourth Manufacturing Device A4)

As the manufacturing device A for manufacturing animal excrement disposal materials according to the present invention, a fourth manufacturing device A4 is explained with reference to FIG. 8. The fourth manufacturing device A4 performs a fourth manufacturing method SA4.

In the fourth manufacturing device A4, each of the granulating part A100, the sorting part A200 and the quality control part A300 is a single machine unit. Here, when the first current sieve is used in the sorting part A200, the granulating part A100, the sorting part A200 and the quality control part A300 form the above-described first granule obtaining part AA. Further, when the second current sieve is used in the sorting part A200, the granulating part A100, the sorting part A200 and the quality control part A300 form the above-described second granule obtaining part AB.

The first animal excrement disposal materials obtained in the first granule obtaining part AA are stored in a storing part A900. After prescribed first animal excrement disposal materials are manufactured, the first current sieve is replaced with the second current sieve, and accordingly, the first granule obtaining part AA is referred to as the second granule obtaining part AB. The second animal excrement disposal materials obtained in the second granule obtaining part AB are transferred to the final processing part A800 together with the first animal excrement disposal materials stored in the storing part A900. Then in the mixing part A810 of the final processing part A800, the first and second animal excrement disposal materials are mixed together in a prescribed ratio.

In this manner, a product in which the animal excrement disposal materials C100 having different comparison data are mixed together in a prescribed ratio can be provided with constant quality.

In the manufacturing method and device for animal excrement disposal materials as explained above in the general basic embodiment, the animal excrement disposal materials C100 having stable quality can be provided. In this case, the animal excrement disposal materials C100 "having stable quality" refer to those having more stable or uniform particle size. Specifically, according to the present invention, variation in the particle size of the animal excrement disposal materials C100 can be reduced, so that a standard deviation in a desired unit of measurement relating to the animal excrement disposal materials C100 can be reduced.

(Embodiment Patterns)

First to 14th embodiment patterns according to the present invention are explained with reference to FIGS. 9 to 36. The embodiment patterns are broadly classified into first to third embodiments by the kind of the comparison data obtained in the comparison data calculating part A500 and a fourth embodiment. In the first embodiment, surface area per unit weight is used as the comparison data. In the second embodiment, surface area is used as the comparison data. In the third embodiment, a standard deviation is used as the comparison data. Further, in the fourth embodiment, a mixture quality control part A303 is provided in the mixing part A810.

In the description of the first to fourth embodiments, structures and process steps identical to those in the above-described general basic embodiment are given like designations and numerals and they are not described herein.

First Embodiment

The manufacturing method and device for animal excrement disposal materials according to the first embodiment of the present invention are explained with reference to FIGS. 9 to 16. The manufacturing method and device for animal excrement disposal materials according to the first embodiment are explained based on the first to fifth embodiment patterns.

In the first embodiment, surface area per unit weight is used as the comparison data which is obtained in the comparison data calculating part A500. Therefore, the surface area per unit weight is also used as the reference data.

First, a step of obtaining the surface area per unit weight of samples as the comparison data in the comparison data calculating part A500 is explained. As described above, the unit numerical value of the animal excrement disposal materials C100 is obtained in the unit numerical value measuring part A510 of the comparison data calculating part A500. At this time, the "particle size" is obtained as the unit numerical value, and the number of the samples whose "particle size" has been measured is measured and stored.

In the comparison data operation part A520, a reference shape which is assumed as a prescribed shape is prepared having the shape of a sphere.

In the comparison data operation part A520, the "radius r of the sample" is obtained based on the particle size obtained in the comparison data calculating part A500. Then the radius r of the sample is assigned to the spherical reference shape, and the surface area of the sample is obtained based on the formula for calculating the surface area of a sphere ($=4\pi r^2$).

Further, in the comparison data operation part A520, the volume of the sample is obtained. Specifically, the radius r of the sample is assigned to the spherical reference shape and the volume of the sample is obtained based on the formula for calculating the volume of a sphere ($=4/3\pi r^3$).

Further, in the comparison data operation part A520, the weight (mass) of the sample is obtained from the volume of the sample. In this case, the specific gravity of the sample is inputted into the comparison data operation part A520. The weight of the sample is obtained by multiplying the volume of the sample by the specific gravity of the sample.

Further, in the comparison data operation part A520, the surface area of the sample is divided by the weight of the sample, so that the surface area per unit weight of the sample is obtained as the comparison data.

At this time, the comparison data is an average value of the surface areas per unit weight of a plurality of the samples. The "average value of the surface areas per unit weight of the samples" is referred to as "average sample surface area per unit weight". Further, the comparison data may also be the surface area per unit weight of each sample. The "surface area per unit weight of each sample" is referred to as "individual sample surface area per unit weight".

The surface area per unit weight used as the reference data is an arbitrarily prescribed numerical value. Therefore, the reference data may also be a surface area per unit weight which is obtained from the animal excrement disposal materials C100 by using the appropriate current sieve B100.

The reference data may or may not have a prescribed numerical range. The reference data "not having a numerical range" refers to a single fixed value.

The reference data is inputted and stored in the reference data storage part A620 of the comparison part A600.

(First Embodiment Pattern)

Figure 9:
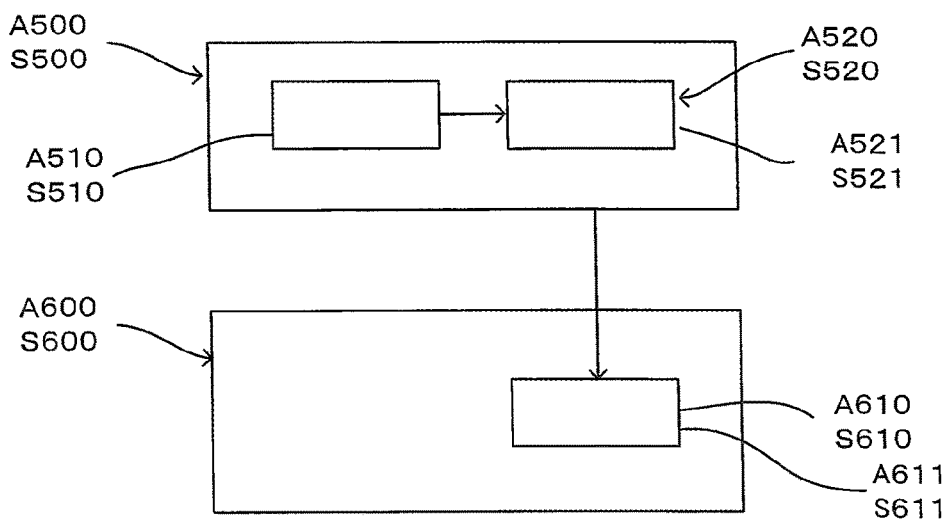
FIG. 9 is a block diagram showing a first embodiment pattern according to the present invention.
Figure 10:
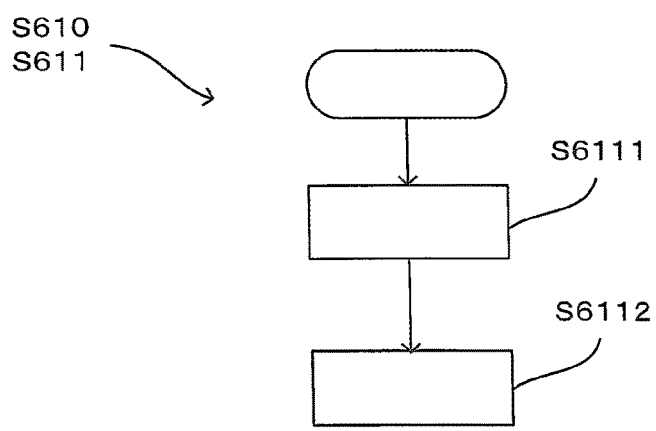
FIG. 10 is a flow chart showing the first embodiment pattern.

The manufacturing method SA and device A for animal excrement disposal materials according to the first embodiment pattern are explained with reference to FIGS. 9 and 10. In the first embodiment pattern, the "average sample surface area per unit weight" is used as the comparison data. The average sample surface area per unit weight is obtained in the comparison data operation part A520 of the comparison data calculating part A500. The comparison data operation part A520 in the first embodiment pattern is defined as a first comparison data operation part A521.

In the manufacturing method SA and device A for animal excrement disposal materials according to the first embodiment pattern, a first comparison operation step S611 is performed in the comparison operation part A610 of the comparison part A600. In the first comparison operation step S611, first, as a first operation processing S6111, the average sample surface area per unit weight is inputted into the comparison operation part A610. Next, as a second operation processing S6112, the average sample surface area per unit weight is transmitted to the sieve replacing part A700. As a result, the operator can grasp the state of the current sieve B110 of the sorting part A200 from the comparison data. Further, when the operator determines from the comparison data that the current sieve B110 is not appropriate, the operator can replace the current sieve B110 with the standby sieve B120.

In this manner, in the manufacturing method SA and device A for animal excrement disposal materials according to the first embodiment pattern, the current sieve B110 of the sorting part A200 can be replaced with the standby sieve B120 based on the comparison data. Therefore, the animal excrement disposal materials C100 having stable quality can be manufactured.

(Second Embodiment Pattern)

Figure 11:
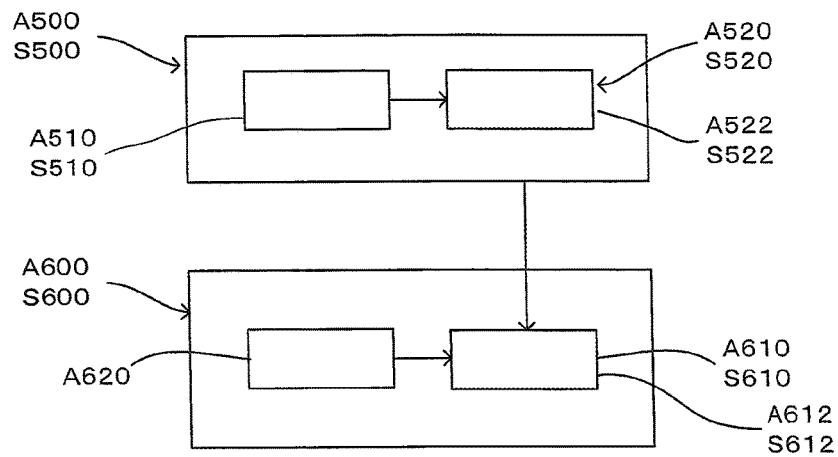
FIG. 11 is a block diagram showing a second embodiment pattern according to the present invention.
Figure 12:
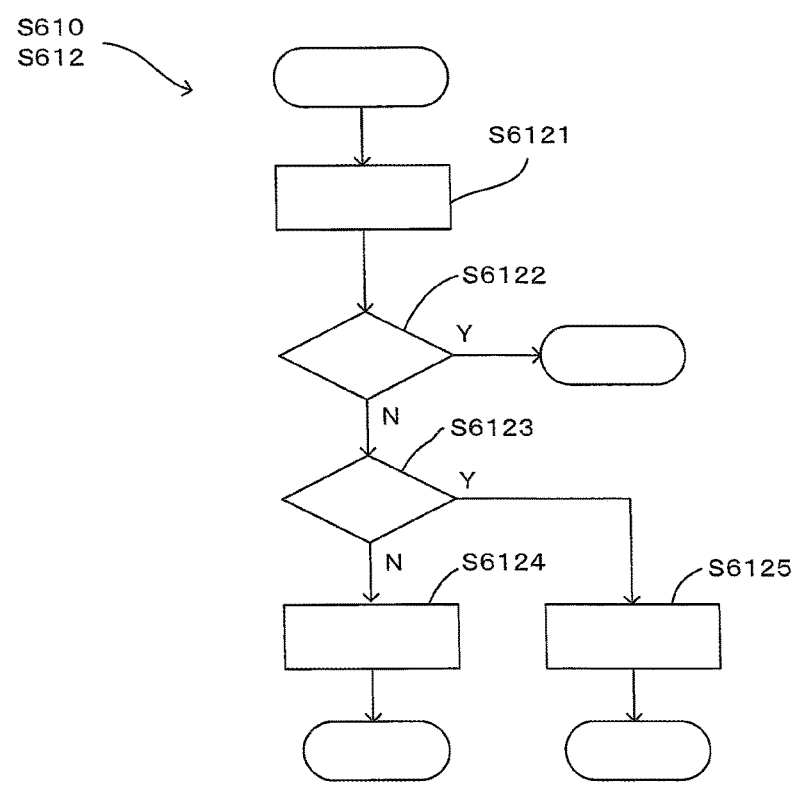
FIG. 12 is a flow chart showing the second embodiment pattern.

The manufacturing method SA and device A for animal excrement disposal materials according to the second embodiment pattern are explained with reference to FIGS. 11 and 12. In the second embodiment pattern, the "average sample surface area per unit weight" is used as the comparison data, and the "reference surface area per unit weight having a prescribed numerical range" is used as the reference data. The average sample surface area per unit weight is obtained in the comparison data operation part A520 of the comparison data calculating part A500. The comparison data operation part A520 in the second embodiment pattern is defined as a second comparison data operation part A522. The reference data is stored in the reference data storage part A620 of the comparison part A600.

In the manufacturing method SA and device A for animal excrement disposal materials according to the second embodiment pattern, a second comparison operation step S612 is performed in the comparison operation part A610 of the comparison part A600. In the second comparison operation step S612, first, as a first operation processing S6121, the average sample surface area per unit weight and the reference surface area per unit weight having a prescribed numerical range are inputted into the comparison operation part A610. Next, as a second operation processing S6122, it is determined whether or not the average sample surface area per unit weight falls within the prescribed numerical range of the reference surface area per unit weight. When it is determined in the second operation processing S6122 that the average sample surface area per unit weight falls within the prescribed numerical range of the reference surface area per unit weight, completion processing is performed. By the completion processing of the second operation processing S6122, the second comparison operation step S612 is reset and the first operation processing S6121 is performed based on the next average sample surface area per unit weight.

On the other hand, when it is determined in the second operation processing S6122 that the average sample surface area per unit weight does not fall within the prescribed numerical range of the reference surface area per unit weight, a third operation processing S6123 is performed.

In the third operation processing S6123, it is determined whether or not the average sample surface area per unit weight exceeds the upper limit of the prescribed numerical range of the reference surface area per unit weight. When it is determined that the average sample surface area per unit weight does not exceed the upper limit of the prescribed numerical range of the reference surface area per unit weight, the average sample surface area per unit weight is considered as being below the lower limit of the prescribed numerical range of the reference surface area per unit weight. This means that the surface area per unit weight of the animal excrement disposal materials C100 is smaller than the desired surface area per unit weight.

In this case, a fourth operation processing S6124 is subsequently performed. In the fourth operation processing S6124, it is indicated to the sieve replacing part A700 that the current sieve B110 needs to be replaced with the standby sieve B120 having a larger mesh size than the current sieve B110.

As a result, in the sieve replacing part A700, the current sieve B110 of the sorting part A200 can be replaced with the standby sieve B120 having a larger mesh size than the current sieve B110.

When it is determined in the third operation processing S6123 that the average sample surface area per unit weight exceeds the upper limit of the prescribed numerical range of the reference surface area per unit weight, it means that the surface area per unit weight of the animal excrement disposal materials C100 is larger than the desired surface area per unit weight.

In this case, a fifth operation processing S6125 is subsequently performed. In the fifth operation processing S6125, it is indicated to the sieve replacing part A700 that the current sieve B110 needs to be replaced with the standby sieve B120 having a smaller mesh size than the current sieve B110.

As a result, in the sieve replacing part A700, the current sieve B110 of the sorting part A200 can be replaced with the standby sieve B120 having a smaller mesh size than the current sieve B110.

In this manner, in the manufacturing method SA and device A for animal excrement disposal materials according to the second embodiment pattern, the average sample surface area per unit weight is used as the comparison data, and the reference surface area per unit weight having a prescribed numerical range is used as the reference data. Thus, the current sieve B110 of the sorting part A200 can be replaced with the standby sieve B120 having an appropriate mesh size. Therefore, the animal excrement disposal materials C100 having stable quality can be manufactured.

Further, in the third operation processing S6123, it is determined whether or not the average sample surface area per unit weight exceeds the "upper limit" of the prescribed range of the reference surface area per unit weight. In the third operation processing S6123, it may also be determined whether or not the average sample surface area per unit weight is below the "lower limit" of the prescribed range of the reference surface area per unit weight. Moreover, in the third operation processing S6123, it can be operated or determined whether the average sample surface area per unit weight "exceeds the upper limit" of the prescribed range of the reference surface area per unit weight and whether it "is below the lower limit" thereof at the same time.

(Third Embodiment Pattern)

Figure 13:
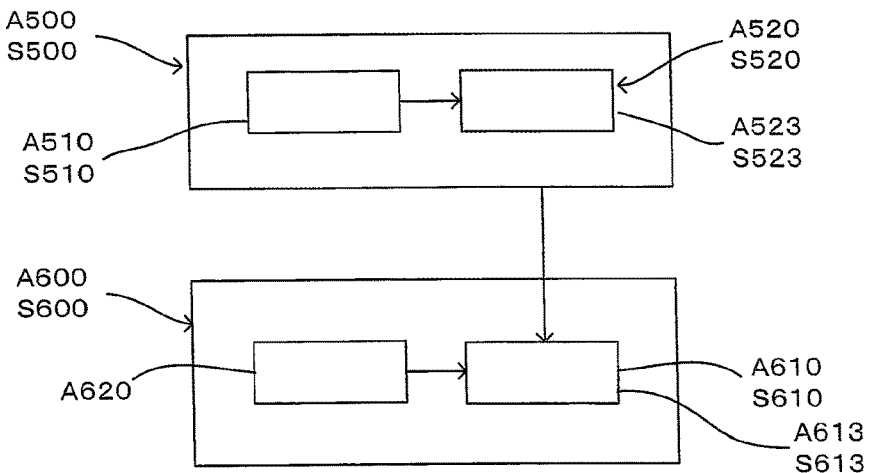
FIG. 13 is a block diagram showing a third embodiment pattern according to the present invention.
Figure 14:
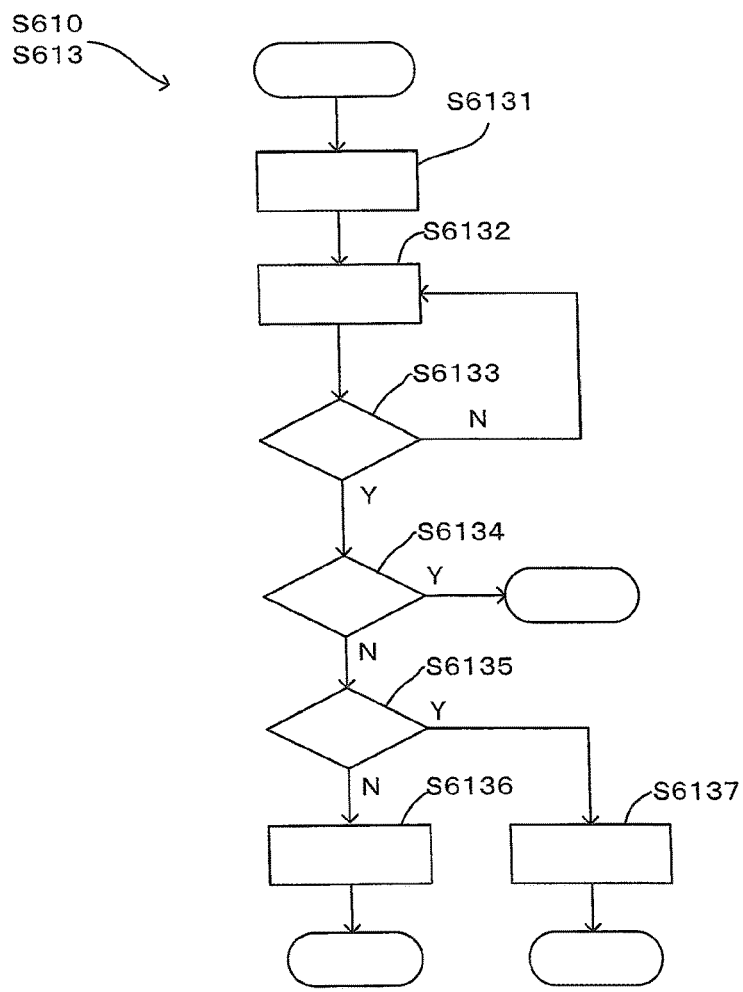
FIG. 14 is a flow chart showing the third embodiment pattern.

The manufacturing method SA and device A for animal excrement disposal materials according to the third embodiment pattern are explained with reference to FIGS. 13 and 14. In the third embodiment pattern, the "individual sample surface area per unit weight" is used as the comparison data, and the "reference surface area per unit weight having a prescribed numerical range" is used as the reference data. The individual sample surface area per unit weight is obtained in the comparison data operation part A520 of the comparison data calculating part A500. The comparison data operation part A520 in the third embodiment pattern is defined as a third comparison data operation part A523. The reference data is stored in the reference data storage part A620 of the comparison part A600.

In the manufacturing method SA and device A for animal excrement disposal materials according to the third embodiment pattern, a third comparison operation step S613 is performed in the comparison operation part A610 of the comparison part A600. In the third comparison operation step S613, first, as a first operation processing S6131, the individual sample surface area per unit weight and the reference surface area per unit weight having a prescribed numerical range are inputted into the comparison operation part A610. Next, as a second operation processing S6132, it is determined whether or not the individual sample surface area per unit weight falls within the prescribed numerical range of the reference surface area per unit weight. At this time, the number of the individual samples is measured and stored. Further, the number of the individual samples whose surface area per unit weight falls within the prescribed numerical range of the reference surface area per unit weight, the number of the individual samples whose surface area per unit weight exceeds the upper limit of the prescribed numerical range of the reference surface area per unit weight, and the number of the individual samples whose surface area per unit weight is below the lower limit of the prescribed numerical range of the reference surface area per unit weight are measured and stored. Furthermore, the number of the individual samples whose surface area per unit weight falls within the prescribed numerical range of the reference surface area per unit weight and the number of the individual samples whose surface area per unit weight does not fall within the prescribed numerical range of the reference surface area per unit weight are measured and stored.

Next, as a third operation processing S6133, it is determined whether or not the number of the individual samples whose surface area per unit weight has been compared with the reference surface area per unit weight reaches a prescribed number. When this number of the compared individual samples does not reach the prescribed number, the second operation processing S6132 is performed until the number of the compared individual samples reaches the prescribed number. When the number of the compared individual samples reaches the prescribed number, a fourth operation processing S6134 is performed.

In the fourth operation processing S6134, the number of the individual samples whose surface area per unit weight falls within the prescribed numerical range of the reference surface area per unit weight is compared. When the number of the individual samples whose surface area per unit weight falls within the prescribed numerical range of the reference surface area per unit weight equals or exceeds a prescribed number, the current sieve B110 of the sorting part A200 is determined to be appropriate. Then, the third comparison operation step S613 is reset by completion processing of the fourth operation processing S6134, and the first operation processing S6131 is performed based on the next average sample surface area per unit weight.

On the other hand, when the number of the individual samples whose surface area per unit weight falls within the prescribed numerical range of the reference surface area per unit weight is smaller than the prescribed number in the fourth operation processing S6134, a fifth operation processing S6135 is performed.

In the fifth operation processing S6135, the number of the individual samples whose surface area per unit weight exceeds the upper limit of the reference surface area per unit weight is compared with the number of the individual samples whose surface area per unit weight is below the lower limit of the reference surface area per unit weight. When it is determined that the number of the individual samples which have a surface area per unit weight exceeding the upper limit of the reference surface area per unit weight is smaller, it means that the surface area per unit weight of the animal excrement disposal materials C100 is smaller than the desired surface area per unit weight.

In this case, a sixth operation processing S6136 is subsequently performed. In the sixth operation processing S6136, it is indicated that the current sieve B110 of the sorting part A200 is to be replaced with the standby sieve B120 having a larger mesh size than the current sieve B110 in the sieve replacing part A700.

As a result, in the sieve replacing part A700, the current sieve B110 of the sorting part A200 can be replaced with the standby sieve B120 having a larger mesh size than the current sieve B110.

When it is determined in the fifth operation processing S6135 that the number of the individual samples which have a surface area per unit weight exceeding the upper limit of the reference surface area per unit weight is larger, it means that the surface area per unit weight of the animal excrement disposal materials C100 is larger than the desired surface area per unit weight.

In this case, a seventh operation processing S6137 is subsequently performed. In the seventh operation processing S6137, it is indicated that the current sieve B110 of the sorting part A200 is to be replaced with the standby sieve B120 having a smaller mesh size than the current sieve B110 in the sieve replacing part A700.

As a result, in the sieve replacing part A700, the current sieve B110 of the sorting part A200 can be replaced with the standby sieve B120 having a smaller mesh size than the current sieve B110.

In this manner, in the manufacturing method SA and device A for animal excrement disposal materials according to the third embodiment pattern, the individual sample surface area per unit weight is used as the comparison data, and the reference surface area per unit weight having a prescribed numerical range is used as the reference data. Thus, the current sieve B110 of the sorting part A200 can be replaced with the standby sieve B120 having an appropriate mesh size. Therefore, the animal excrement disposal materials C100 having stable quality can be manufactured.

Further, in the third embodiment pattern, the determination is made based on the "number" of the measured individual samples, but it may also be made, for example, based on the "ratio" of the individual samples whose surface area per unit weight falls within the prescribed range of the reference surface area per unit weight in all the measured individual samples, or the "ratio" of the individual samples whose surface area per unit weight exceeds the upper limit of the reference surface area per unit weight to the individual samples whose surface area per unit weight is below the lower limit of the reference surface area per unit weight.

(Fourth Embodiment Pattern)

Figure 15:
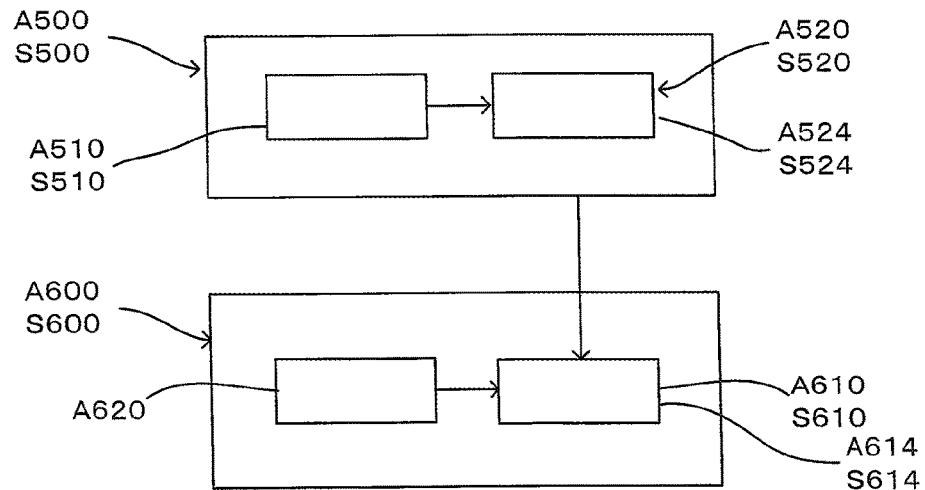
FIG. 15 is a block diagram showing a fourth embodiment pattern according to the present invention.
Figure 16:
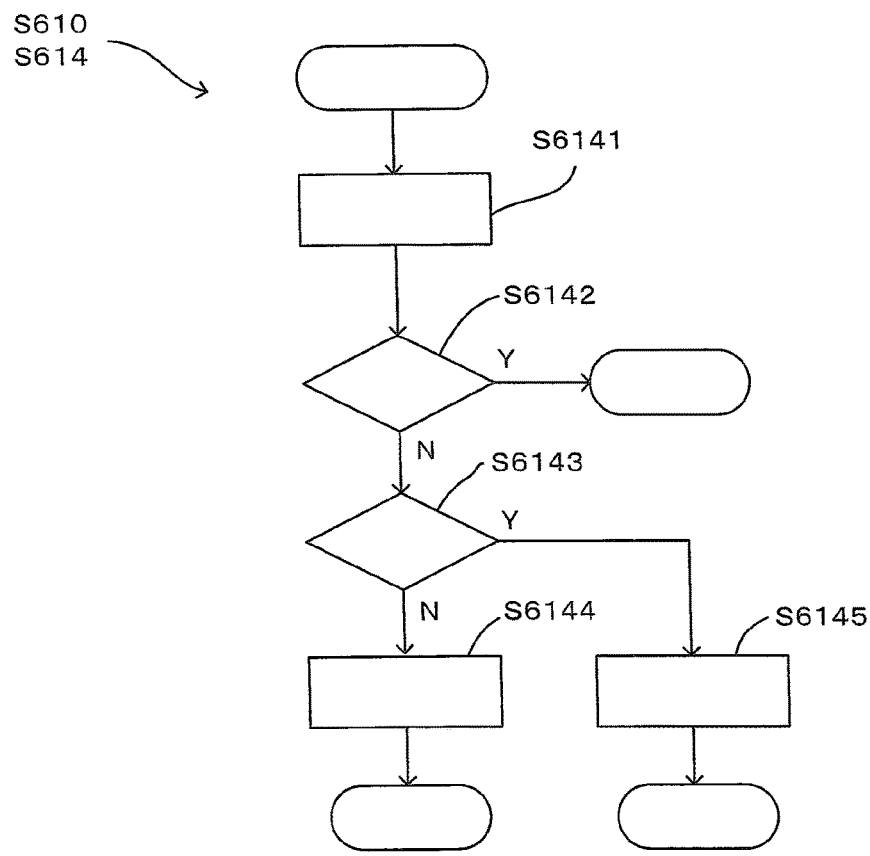
FIG. 16 is a flow chart showing the fourth embodiment pattern.

The manufacturing method SA and device A for animal excrement disposal materials according to the fourth embodiment pattern are explained with reference to FIGS. 15 and 16. In the fourth embodiment pattern, the "average sample surface area per unit weight" is used as the comparison data, and the "reference surface area per unit weight having a fixed numerical value" is used as the reference data. When the "reference surface area per unit weight having a fixed numerical value" is used as the reference surface area per unit weight, the number of the samples which are determined not to be appropriate tends to increase compared with that in the above-described second and third embodiment patterns using the "reference surface area per unit weight having a prescribed numerical range". Therefore, it is suitable to use the "reference surface area per unit weight having a fixed numerical value" as the reference data in order to obtain the animal excrement disposal materials C100 in which uniformity of the surface area per unit weight is strongly required.

The average sample surface area per unit weight is obtained in the comparison data operation part A520 of the comparison data calculating part A500. The comparison data operation part A520 in the fourth embodiment pattern is defined as a fourth comparison data operation part A524. The reference data is stored in the reference data storage part A620 of the comparison part A600.

In the manufacturing method SA and device A for animal excrement disposal materials according to the fourth embodiment pattern, a fourth comparison operation step S614 is performed in the comparison operation part A610 of the comparison part A600. In the fourth comparison operation step S614, first, as a first operation processing S6141, the average sample surface area per unit weight and the reference surface area per unit weight having a prescribed fixed numerical value are inputted into the comparison operation part A610. Next, as a second operation processing S6142, it is determined whether or not the average sample surface area per unit weight is equal to the fixed numerical value of the reference surface area per unit weight. When it is determined in the second operation processing S6142 that the average sample surface area per unit weight is equal to the fixed numerical value of the reference surface area per unit weight, completion processing is performed. By the completion processing of the second operation processing S6142, the fourth comparison operation step S614 is reset and the first operation processing S6141 is performed based on the next average sample surface area per unit weight.

On the other hand, when it is determined in the second operation processing S6142 that the average sample surface area per unit weight is not equal to the fixed numerical value of the reference surface area per unit weight, a third operation processing S6143 is performed.

In the third operation processing S6143, it is determined whether or not the average sample surface area per unit weight exceeds the fixed numerical value of the reference surface area per unit weight. When it is determined that the average sample surface area per unit weight does not exceed the fixed numerical value of the reference surface area per unit weight, the average sample surface area per unit weight is considered as being smaller than the fixed numerical value of the reference surface area per unit weight. This means that the surface area per unit weight of the animal excrement disposal materials C100 is smaller than the desired surface area per unit weight.

In this case, a fourth operation processing S6144 is subsequently performed. In the fourth operation processing S6144, it is indicated that the current sieve B110 of the sorting part A200 is to be replaced with the standby sieve B120 having a larger mesh size than the current sieve B110 in the sieve replacing part A700.

As a result, in the sieve replacing part A700, the current sieve B110 of the sorting part A200 can be replaced with the standby sieve B120 having a larger mesh size than the current sieve B110.

When it is determined in the third operation processing S6143 that the average sample surface area per unit weight exceeds the fixed numerical value of the reference surface area per unit weight, it means that the surface area per unit weight of the animal excrement disposal materials C100 is larger than the desired surface area per unit weight.

In this case, a fifth operation processing S6145 is subsequently performed. In the fifth operation processing S6145, it is indicated that the current sieve B110 of the sorting part A200 is to be replaced with the standby sieve B120 having a smaller mesh size than the current sieve B110 in the sieve replacing part A700.

As a result, in the sieve replacing part A700, the current sieve B110 of the sorting part A200 can be replaced with the standby sieve B120 having a smaller mesh size than the current sieve B110.

In this manner, in the manufacturing method SA and device A for animal excrement disposal materials according to the fourth embodiment pattern, the average sample surface area per unit weight is used as the comparison data, and the reference surface area per unit weight having a fixed numerical value is used as the reference data. Thus, the current sieve B110 of the sorting part A200 can be replaced with the standby sieve B120 having an appropriate mesh size. Therefore, the animal excrement disposal materials C100 having stable quality can be manufactured.

Further, in the third operation processing S6143, it is determined whether or not the average sample surface area per unit weight exceeds the fixed numerical value of the reference surface area per unit weight, but it may also be determined whether or not the average sample surface area per unit weight is smaller than the fixed numerical value of the reference surface area per unit weight.

(Fifth Embodiment Pattern)

Figure 17:
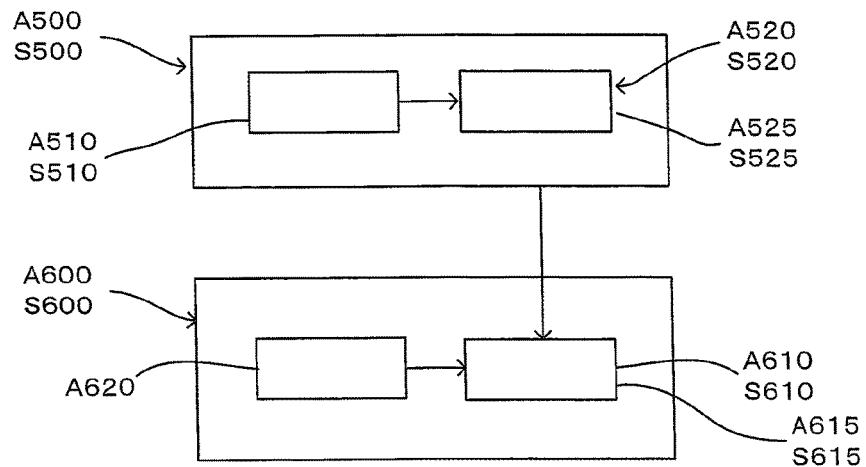
FIG. 17 is a block diagram showing a fifth embodiment pattern according to the present invention.
Figure 18:
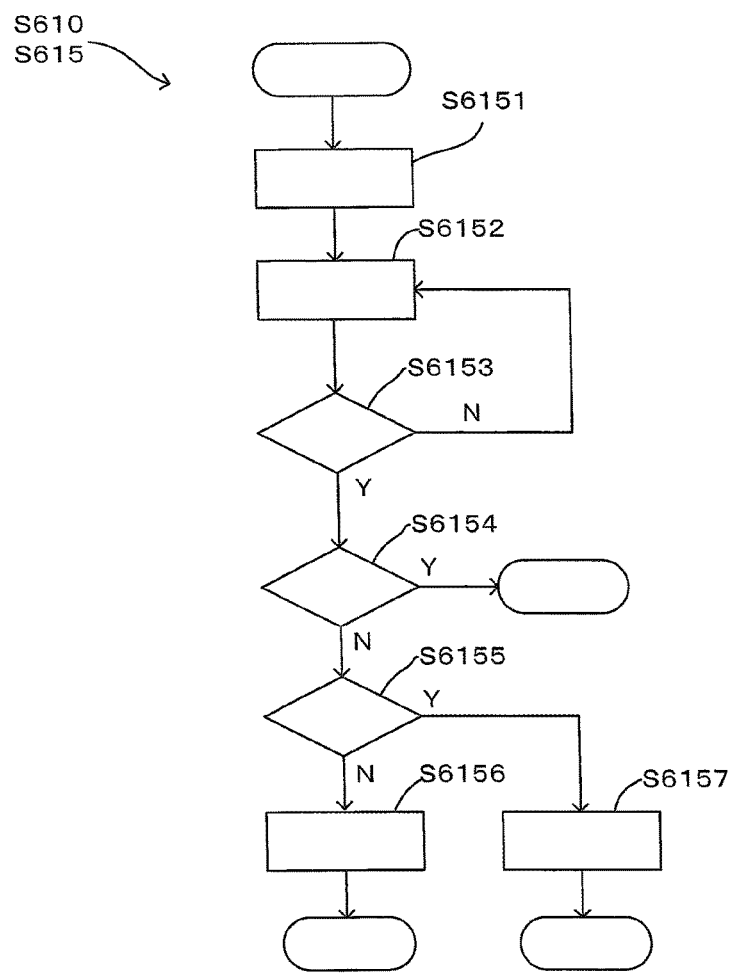
FIG. 18 is a flow chart showing the fifth embodiment pattern.

The manufacturing method SA and device A for animal excrement disposal materials according to the fifth embodiment pattern are explained with reference to FIGS. 17 and 18. In the fifth embodiment pattern, the "individual sample surface area per unit weight" is used as the comparison data, and the "reference surface area per unit weight having a fixed numerical value" is used as the reference data.

The individual sample surface area per unit weight is obtained in the comparison data operation part A520 of the comparison data calculating part A500. The comparison data operation part A520 in the fifth embodiment pattern is defined as a fifth comparison data operation part A525. The reference data is stored in the reference data storage part 620 of the comparison part A600.

In the manufacturing method SA and device A for animal excrement disposal materials according to the fifth embodiment pattern, a fifth comparison operation step S615 is performed in the comparison operation part A610 of the comparison part A600. In the fifth comparison operation step S615, first, as a first operation processing S6151, the individual sample surface area per unit weight and the fixed numerical value of the reference surface area per unit weight are inputted into the comparison operation part A610. Next, as a second operation processing S6152, it is determined whether or not the individual sample surface area per unit weight is equal to the fixed numerical value of the reference surface area per unit weight. At this time, the number of the individual samples is measured and stored. Further, the number of the individual samples whose surface area per unit weight is equal to the fixed numerical value of the reference surface area per unit weight, the number of the individual samples whose surface area per unit weight is larger than the fixed numerical value of the reference surface area per unit weight, and the number of the individual samples whose surface area per unit weight is smaller than the fixed numerical value of the reference surface area per unit weight are measured and stored. Furthermore, the number of the individual samples whose surface area per unit weight is equal to the fixed numerical value of the reference surface area per unit weight and the number of the individual samples whose surface area per unit weight is not equal to the fixed numerical value of the reference surface area per unit weight are measured and stored.

Next, as a third operation processing S6153, it is determined whether or not the number of the individual samples whose surface area per unit weight has been compared with the reference surface area per unit weight reaches a prescribed number. When this number of the compared individual samples does not reach the prescribed number, the second operation processing S6152 is performed until the number of the compared individual samples reaches the prescribed number. When the number of the compared individual samples reaches the prescribed number, a fourth operation processing S6154 is performed.

In the fourth operation processing S6154, the number of the individual samples whose surface area per unit weight is equal to the fixed numerical value of the reference surface area per unit weight is compared. When the number of the individual samples whose surface area per unit weight is equal to the fixed numerical value of the reference surface area per unit weight equals or exceeds a prescribed number, the current sieve B110 of the sorting part A200 is determined to be appropriate. In this case, completion processing is performed in the fourth operation processing S6154. By the completion processing of the fourth operation processing S6154, the fifth comparison operation step S615 is reset and the first operation processing S6151 is performed based on the next average sample surface area per unit weight.

On the other hand, when the number of the individual samples whose surface area per unit weight is equal to the fixed numerical value of the reference surface area per unit weight is smaller than the prescribed number in the fourth operation processing S6154, a fifth operation processing S6155 is performed.

In the fifth operation processing S6155, the number of the individual samples whose surface area per unit weight is larger than the fixed numerical value of the reference surface area per unit weight is compared with the number of the individual samples whose surface area per unit weight is smaller than the fixed numerical value of the reference surface area per unit weight. When the number of the individual samples whose surface area per unit weight is larger than the fixed numerical value of the reference surface area per unit weight is smaller, it means that the surface area per unit weight of the animal excrement disposal materials C100 is smaller than the desired surface area per unit weight.

In this case, a sixth operation processing S6156 is subsequently performed. In the sixth operation processing S6156, it is indicated that the current sieve B110 of the sorting part A200 is to be replaced with the standby sieve B120 having a larger mesh size than the current sieve B110 in the sieve replacing part A700.

As a result, in the sieve replacing part A700, the current sieve B110 of the sorting part A200 can be replaced with the standby sieve B120 having a larger mesh size than the current sieve B110.

When it is determined in the fifth operation processing S6155 that the number of the individual samples whose surface area per unit weight is larger than the fixed numerical value of the reference surface area per unit weight is smaller, it means that the surface area per unit weight of the animal excrement disposal materials C100 is larger than the desired surface area per unit weight.

In this case, a seventh operation processing S6157 is subsequently performed. In the seventh operation processing S6157, it is indicated that the current sieve B110 of the sorting part A200 is to be replaced with the standby sieve B120 having a smaller mesh size than the current sieve B110 in the sieve replacing part A700.

As a result, in the sieve replacing part A700, the current sieve B110 of the sorting part A200 can be replaced with the standby sieve B120 having a smaller mesh size than the current sieve B110.

In this manner, in the manufacturing method SA and device A for animal excrement disposal materials according to the fifth embodiment pattern, the individual sample surface area per unit weight and the reference surface area per unit weight having a fixed numerical value are used as the comparison data and the reference data, respectively. Thus, the current sieve B110 of the sorting part A200 can be replaced with the standby sieve B120 having an appropriate mesh size. Therefore, the animal excrement disposal materials C100 having stable quality can be manufactured.

Further, in the fifth embodiment pattern, the determination is made based on the "number" of the measured individual samples, but it may also be made, for example, based on the "ratio" of the individual samples whose surface area per unit weight is equal to the reference surface area per unit weight, in all the measured individual samples, or the "ratio" of the individual samples whose surface area per unit weight is larger than the reference surface area per unit weight, to the individual samples whose surface area per unit weight is smaller than the reference surface area per unit weight.

Second Embodiment

The manufacturing method and device for animal excrement disposal materials according to the second embodiment of the present invention are explained with reference to FIGS. 19 to 28. The manufacturing method and device for animal excrement disposal materials according to the second embodiment are explained based on the sixth to 10th embodiment patterns.

In the second embodiment, surface area is used as the comparison data which is obtained in the comparison data calculating part A500. Therefore, the surface area is also used as the reference data which is compared with the comparison data in the comparison part A600.

First, a step of obtaining the surface area of samples as the comparison data in the comparison data calculating part A500 is explained. As described above, the unit numerical value of the animal excrement disposal materials C100 is obtained in the unit numerical value measuring part A510 of the comparison data calculating part A500. At this time, the "particle size" is obtained as the unit numerical value, and the number of the samples whose "particle size" has been measured is measured and stored.

In the comparison data operation part A520, a reference shape which is assumed as a prescribed shape is prepared having the shape of a sphere.

In the comparison data operation part A520, the "radius r of the sample" is obtained based on the particle size obtained in the comparison data calculating part A500. Then the radius r of the sample is assigned to the spherical reference shape, and the surface area of the sample is obtained based on the formula for calculating the surface area of a sphere ($=4\pi r^2$). In the present invention, this surface area based on the reference shape is defined as the surface area of the sample.

At this time, the comparison data is an average value of the surface areas of the samples. The "average value of the surface areas of the samples" is referred to as "average sample surface area per unit weight". Further, the comparison data may also be a surface area of each sample. The "surface area of each sample" is referred to as "individual sample surface area".

The surface area used as the reference data is an arbitrarily prescribed numerical value. Therefore, the reference data may also be a surface area which is obtained from the animal excrement disposal materials C100 by using the appropriate current sieve B100.

The reference data may or may not have a prescribed numerical range. The reference data "not having a numerical range" refers to a single fixed value.

The reference data is inputted and stored in the reference data storage part A620 of the comparison part A600.

(Sixth Embodiment Pattern)

Figure 19:
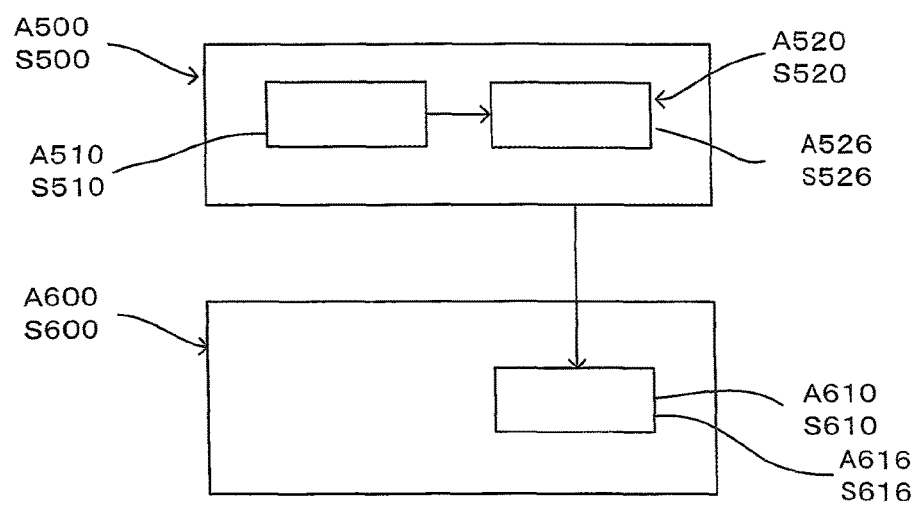
FIG. 19 is a block diagram showing a sixth embodiment pattern according to the present invention.
Figure 20:
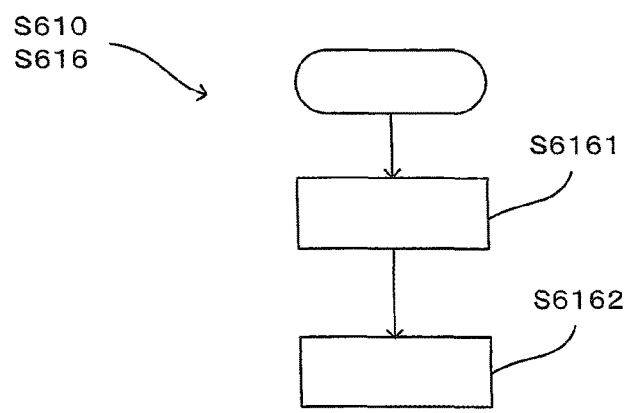
FIG. 20 is a flow chart showing the sixth embodiment pattern.

The manufacturing method SA and device A for animal excrement disposal materials according to the sixth embodiment pattern are explained with reference to FIGS. 19 and 20. In the sixth embodiment pattern, the "average sample surface area" is used as the comparison data. The average sample surface area is obtained in the comparison data operation part A520 of the comparison data calculating part A500. The comparison data operation part A520 in the sixth embodiment pattern is defined as a sixth comparison data operation part A526.

In the manufacturing method SA and device A for animal excrement disposal materials according to the sixth embodiment pattern, a sixth comparison operation step S616 is performed in the comparison operation part A610 of the comparison part A600. In the sixth comparison operation step S616, first, as a first operation processing S6161, the average sample surface area is inputted into the comparison operation part A610. Next, as a second operation processing S6162, the average sample surface area is transmitted to the sieve replacing part A700. As a result, the operator can grasp the state of the current sieve B110 of the sorting part A200 from the comparison data. Further, when the operator determines from the comparison data that the current sieve B110 is not appropriate, the operator can replace the current sieve B110 with the standby sieve B120.

In this manner, in the manufacturing method SA and device A for animal excrement disposal materials according to the sixth embodiment pattern, the current sieve B110 of the sorting part A200 can be replaced with the standby sieve B120 based on the comparison data. Therefore, the animal excrement disposal materials C100 having stable quality can be manufactured.

(Seventh Embodiment Pattern)

Figure 21:
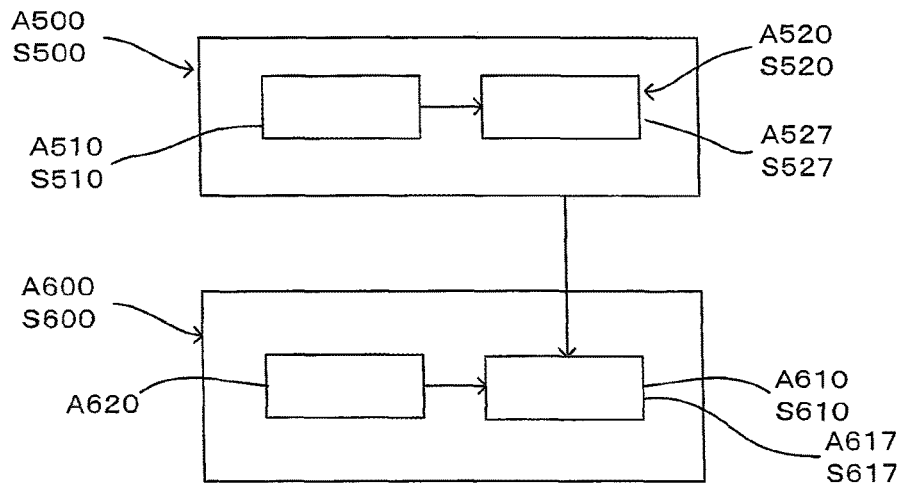
FIG. 21 is a block diagram showing a seventh embodiment pattern according to the present invention.
Figure 22:
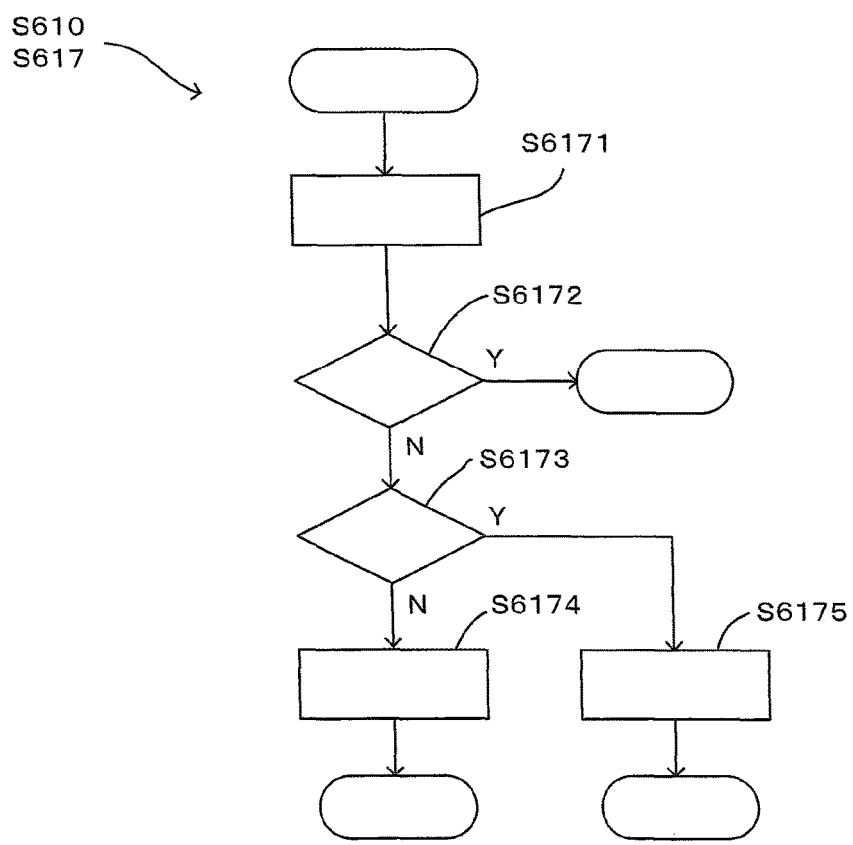
FIG. 22 is a flow chart showing the seventh embodiment pattern.

The manufacturing method SA and device A for animal excrement disposal materials according to the seventh embodiment pattern are explained with reference to FIGS. 21 and 22. In the seventh embodiment pattern, the "average sample surface area per unit weight" is used as the comparison data, and the "reference surface area per unit weight having a prescribed numerical range" is used as the reference data. The average sample surface area is obtained in the comparison data operation part A520 of the comparison data calculating part A500. The comparison data operation part A520 in the seventh embodiment pattern is defined as a seventh comparison data operation part A527. The reference data is stored in the reference data storage part A620 of the comparison part A600.

In the manufacturing method SA and device A for animal excrement disposal materials according to the seventh embodiment pattern, a seventh comparison operation step S617 is performed in the comparison operation part A610 of the comparison part A600. In the seventh comparison operation step S617, first, as a first operation processing S6171, the average sample surface area and the reference surface area having a prescribed numerical range are inputted into the comparison operation part A610. Next, as a second operation processing S6172, it is determined whether or not the average sample surface area falls within the prescribed numerical range of the reference surface area. When it is determined in the second operation processing S6172 that the average sample surface area falls within the prescribed numerical range of the reference surface area, completion processing is performed. By the completion processing of the second operation processing S6172, the seventh comparison operation step S617 is reset and the first operation processing S6171 is performed based on the next average sample surface area.

On the other hand, when it is determined in the second operation processing S6172 that the average sample surface area does not fall within the prescribed numerical range of the reference surface area, a third operation processing S6173 is performed.

In the third operation processing S6173, it is determined whether or not the average sample surface area exceeds the upper limit of the prescribed numerical range of the reference surface area. When it is determined that the average sample surface area does not exceed the upper limit of the prescribed numerical range of the reference surface area, the average sample surface area is considered as being below the lower limit of the prescribed numerical range of the reference surface area. This means that the surface area of the animal excrement disposal materials C100 is smaller than the desired surface area.

In this case, a fourth operation processing S6174 is subsequently performed. In the fourth operation processing S6174, it is indicated to the sieve replacing part A700 that the current sieve B110 needs to be replaced with the standby sieve B120 having a larger mesh size than the current sieve B110.

As a result, in the sieve replacing part A700, the current sieve B110 of the sorting part A200 can be replaced with the standby sieve B120 having a larger mesh size than the current sieve B110.

When it is determined in the third operation processing S6173 that the average sample surface area exceeds the upper limit of the prescribed numerical range of the reference surface area, it means that the surface area of the animal excrement disposal materials C100 is larger than the desired surface area.

In this case, a fifth operation processing S6175 is subsequently performed. In the fifth operation processing S6175, it is indicated to the sieve replacing part A700 that the current sieve B110 needs to be replaced with the standby sieve B120 having a smaller mesh size than the current sieve B110.

As a result, in the sieve replacing part A700, the current sieve B110 of the sorting part A200 can be replaced with the standby sieve B120 having a smaller mesh size than the current sieve B110.

In this manner, in the manufacturing method SA and device A for animal excrement disposal materials according to the seventh embodiment pattern, the average sample surface area and the reference surface area having a prescribed numerical range are used as the comparison data and the reference data, respectively. Thus, the current sieve B110 of the sorting part A200 can be replaced with the standby sieve B120 having an appropriate mesh size. Therefore, the animal excrement disposal materials C100 having stable quality can be manufactured.

Further, in the third operation processing S6173, it is determined whether or not the average sample surface area exceeds the "upper limit" of the prescribed range of the reference surface area. In the third operation processing S6173, it may also be determined whether or not the average sample surface area is below the "lower limit" of the prescribed range of the reference surface area. Moreover, in the third operation processing S6173, it can be operated or determined whether the average sample surface area "exceeds the upper limit" of the prescribed numerical range of the reference surface area and whether it "is below the lower limit" thereof at the same time.

(Eighth Embodiment Pattern)

Figure 23:
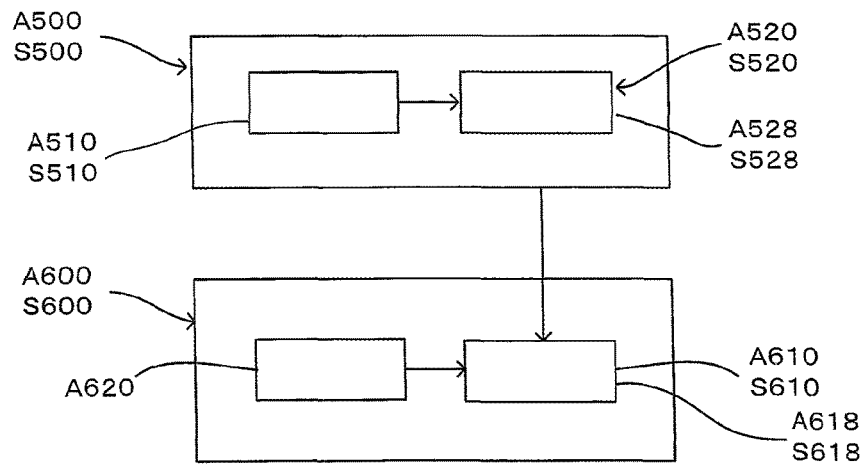
FIG. 23 is a block diagram showing an eighth embodiment pattern according to the present invention.
Figure 24:
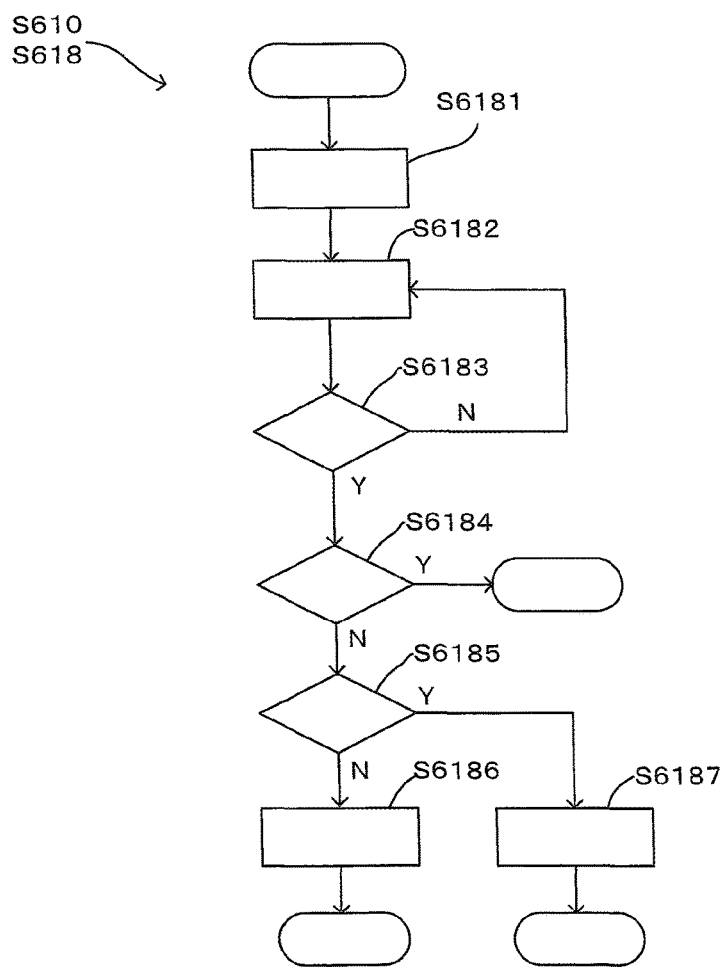
FIG. 24 is a flow chart showing the eighth embodiment pattern.

The manufacturing method SA and device A for animal excrement disposal materials according to the eighth embodiment pattern are explained with reference to FIGS. 23 and 24. In the eighth embodiment pattern, the "individual sample surface area" and the "reference surface area having a prescribed numerical range" are used as the comparison data and the reference data, respectively. The individual sample surface area is obtained in the comparison data operation part A520 of the comparison data calculating part A500. The comparison data operation part A520 in the eighth embodiment pattern is defined as an eighth comparison data operation part A528. The reference data is stored in the reference data storage part A620 of the comparison part A600.

In the manufacturing method SA and device A for animal excrement disposal materials according to the eighth embodiment pattern, an eighth comparison operation step S618 is performed in the comparison operation part A610 of the comparison part A600. In the eighth comparison operation step S618, first, as a first operation processing S6181, the individual sample surface area and the reference surface area having a prescribed numerical range are inputted into the comparison operation part A610. Next, as a second operation processing S6182, it is determined whether or not the individual sample surface area falls within the prescribed numerical range of the reference surface area. At this time, the number of the individual samples is measured and stored. Further, the number of the individual samples whose surface area falls within the prescribed numerical range of the reference surface area, the number of the individual samples whose surface area exceeds the upper limit of the prescribed numerical range of the reference surface area, and the number of the individual samples whose surface area is below the lower limit of the prescribed numerical range of the reference surface area are measured and stored. Furthermore, the number of the individual samples whose surface area falls within the prescribed numerical range of the reference surface area and the number of the individual samples whose surface area does not fall within the prescribed numerical range of the reference surface area are measured and stored.

Next, as a third operation processing S6183, it is determined whether or not the number of the individual samples whose surface area has been compared with the reference surface area reaches a prescribed number. When this number of the compared individual samples does not reach the prescribed numerical value, the second operation processing S6182 is performed until the number of the compared individual samples reaches the prescribed number. When the number of the compared individual sample reaches the prescribed number, a fourth operation processing S6184 is performed.

In the fourth operation processing S6184, the number of the individual samples whose surface area falls within the prescribed numerical range of the reference surface area is compared. When the number of the individual samples whose surface area falls within the prescribed numerical range of the reference surface area equals or exceeds a prescribed number, the current sieve B110 of the sorting part A200 is determined to be appropriate. Then, the eighth comparison operation step S618 is reset by completion processing of the fourth operation processing S6184, and the first operation processing S6181 is performed based on the next average sample surface area.

On the other hand, when the number of the individual samples whose surface area falls within the prescribed numerical range of the reference surface area is smaller than the prescribed number in the fourth operation processing S6184, a fifth operation processing S6185 is performed.

In the fifth operation processing S6185, the number of the individual samples whose surface area exceeds the upper limit of the reference surface area is compared with the number of the individual samples whose surface area which is below the lower limit of the reference surface area. When it is determined that the number of the individual samples whose surface area exceeds the upper limit of the reference surface area is smaller, it means that the surface area of the animal excrement disposal materials C100 is smaller than the desired surface area.

In this case, a sixth operation processing S6186 is subsequently performed. In the sixth operation processing S6186, it is indicated that the current sieve B110 of the sorting part A200 is to be replaced with the standby sieve B120 having a larger mesh size than the current sieve B110 in the sieve replacing part A700.

As a result, in the sieve replacing part A700, the current sieve B110 of the sorting part A200 can be replaced with the standby sieve B120 having a larger mesh size than the current sieve B110.

When it is determined in the fifth operation processing S6185 that the number of the individual samples whose surface area exceeds the upper limit of the prescribed numerical range of the reference surface area is smaller, it means that the surface area of the animal excrement disposal materials C100 is larger than the desired surface area.

In this case, a seventh operation processing S6187 is subsequently performed. In the seventh operation processing S6187, it is indicated that the current sieve B110 of the sorting part A200 is to be replaced with the standby sieve B120 having a smaller mesh size than the current sieve B110 in the sieve replacing part A700.

As a result, in the sieve replacing part A700, the current sieve B110 of the sorting part A200 can be replaced with the standby sieve B120 having a smaller mesh size than the current sieve B110.

In this manner, in the manufacturing method SA and device A for animal excrement disposal materials according to the eighth embodiment pattern, the individual sample surface area and the reference surface area having a prescribed numerical range are used as the comparison data and the reference data, respectively. Thus, the current sieve B110 of the sorting part A200 can be replaced with the standby sieve B120 having an appropriate mesh size. Therefore, the animal excrement disposal materials C100 having stable quality can be manufactured.

Further, in the eighth embodiment pattern, the determination is made based on the "number" of the measured individual samples, but it may also be made, for example, based on the "ratio" of the individual samples whose surface area falls within the prescribed range of the reference surface area, in all the measured individual samples, or the "ratio" of the individual samples whose surface area exceeds the upper limit of the reference surface area, to the individual samples whose surface area is below the lower limit of the reference surface area.

(Ninth Embodiment Pattern)

Figure 25:
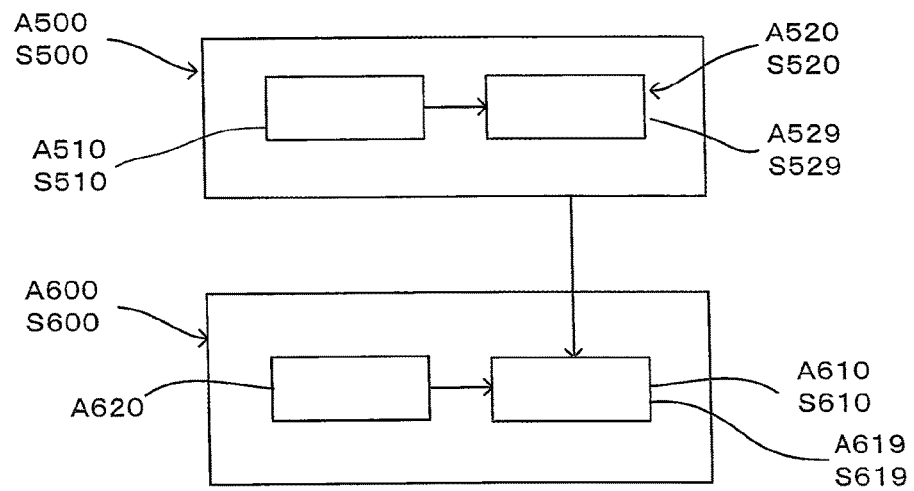
FIG. 25 is a block diagram showing a ninth embodiment pattern according to the present invention.
Figure 26:
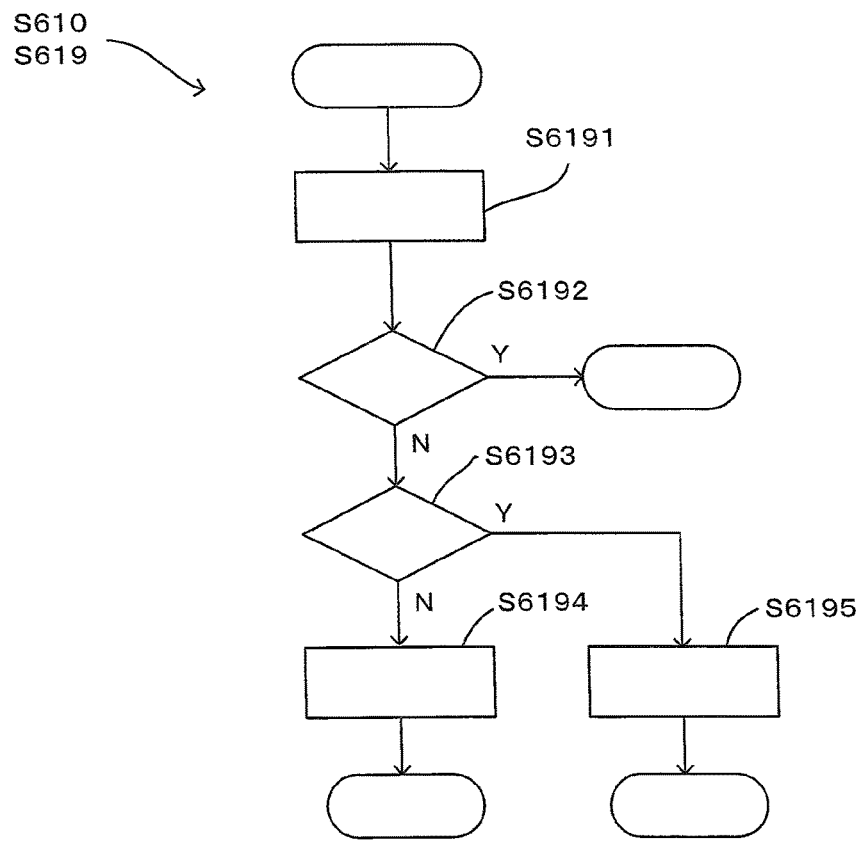
FIG. 26 is a flow chart showing the ninth embodiment pattern.

The manufacturing method SA and device A for animal excrement disposal materials according to the ninth embodiment pattern are explained with reference to FIGS. 25 and 26. In the ninth embodiment pattern, the "average sample surface area" and the "reference surface area having a fixed numerical value" are used as the comparison data and the reference data, respectively. When the "the reference surface area having a fixed numerical value" is used as the reference surface area, the number of the samples which are determined not to be appropriate tends to increase compared with that of the above-described seventh and eighth embodiment patterns using the "reference surface area having a prescribed numerical range". Therefore, it is suitable to use the "reference surface area having a fixed numerical value" as the reference data in order to obtain the animal excrement disposal materials C100 in which uniformity of the surface area is strongly required.

The average sample surface area is obtained in the comparison data operation part A520 of the comparison data calculating part A500. The comparison data operation part A520 in the ninth embodiment pattern is defined as a ninth comparison data operation part A529. The reference data is stored in the reference data storage part 620 of the comparison part A600.

In the manufacturing method SA and device A for animal excrement disposal materials according to the ninth embodiment pattern, a ninth comparison operation step S619 is performed in the comparison operation part A610 of the comparison part A600. In the ninth comparison operation step S619, first, as a first operation processing S6191, the average sample surface area and the reference surface area having a prescribed fixed numerical value are inputted into the comparison operation part A610. Next, as a second operation processing S6192, it is determined whether or not the average sample surface area is equal to the fixed numerical value of the reference surface area. When it is determined in the second operation processing S6192 that the average sample surface area is equal to the fixed numerical value of the reference surface area, completion processing is performed. By the completion processing of the second operation processing S6192, the ninth comparison operation step S619 is reset and the first operation processing S6191 is performed based on the next average sample surface area.

On the other hand, when it is determined in the second operation processing S6192 that the average sample surface area is not equal to the fixed numerical value of the reference surface area, a third operation processing S6193 is performed.

In the third operation processing S6193, it is determined whether or not the average sample surface area exceeds the fixed numerical value of the reference surface area. When it is determined that the average sample surface area does not exceed the fixed numerical value of the reference surface area, the average sample surface area is considered as being smaller than the fixed numerical value of the reference surface area. This means that the surface area of the animal excrement disposal materials C100 is smaller than the desired surface area.

In this case, a fourth operation processing S6194 is subsequently performed. In the fourth operation processing S6194, it is indicated that the current sieve B110 of the sorting part A200 is to be replaced with the standby sieve B120 having a larger mesh size than the current sieve B110 in the sieve replacing part A700.

As a result, in the sieve replacing part A700, the current sieve B110 of the sorting part A200 can be replaced with the standby sieve B120 having a larger mesh size than the current sieve B110.

When it is determined in the third operation processing S6193 that the average sample surface area exceeds the fixed numerical value of the reference surface area, it means that the surface area of the animal excrement disposal materials C100 is larger than the desired surface area.

In this case, a fifth operation processing S6195 is subsequently performed. In the fifth operation processing S6195, it is indicated that the current sieve B110 of the sorting part A200 is to be replaced with the standby sieve B120 having a smaller mesh size than the current sieve B110 in the sieve replacing part A700.

As a result, in the sieve replacing part A700, the current sieve B110 of the sorting part A200 can be replaced with the standby sieve B120 having a smaller mesh size than the current sieve B110.

In this manner, in the manufacturing method SA and device A for animal excrement disposal materials according to the ninth embodiment pattern, the average sample surface area and the reference surface area having a fixed numerical value are used as the comparison data and the reference data, respectively. Thus, the current sieve B110 of the sorting part A200 can be replaced with the standby sieve B120 having an appropriate mesh size. Therefore, the animal excrement disposal materials C100 having stable quality can be manufactured.

Further, in the third operation processing S6193, it is determined whether or not the average sample surface area exceeds the fixed numerical value of the reference surface area, but it may also be determined whether or not the average sample surface area is smaller than the fixed numerical value of the reference surface area.

(10th Embodiment Pattern)

Figure 27:
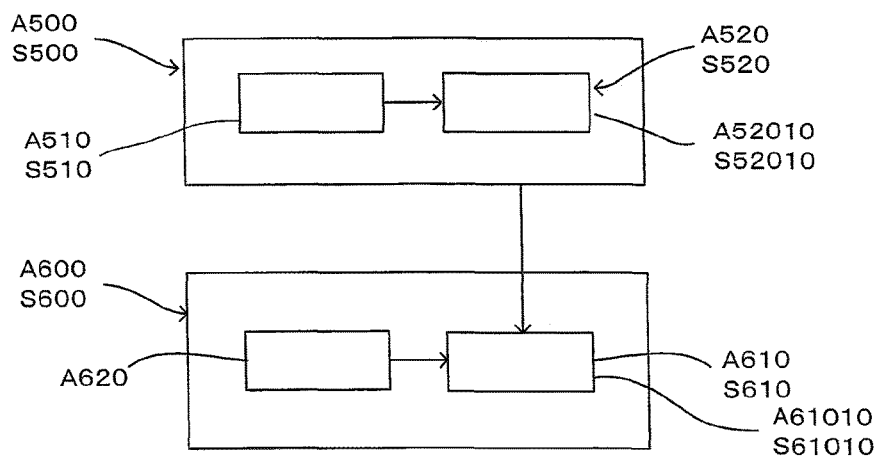
FIG. 27 is a block diagram showing a 10th embodiment pattern according to the present invention.
Figure 28:
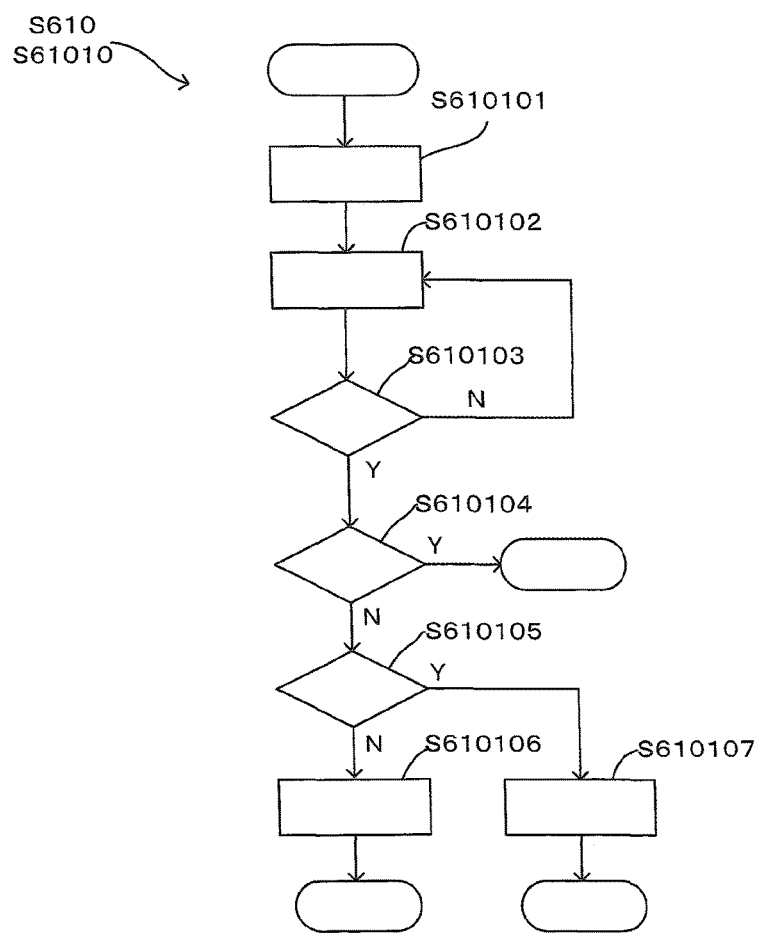
FIG. 28 is a flow chart showing the 10th embodiment pattern.

The manufacturing method SA and device A for animal excrement disposal materials according to the 10th embodiment pattern are explained with reference to FIGS. 27 and 28. In the 10th embodiment pattern, the "individual sample surface area" and the "reference surface area having a fixed numerical value" are used as the comparison data and the reference data, respectively.

The individual sample surface area is obtained in the comparison data operation part A520 of the comparison data calculating part A500. The comparison data operation part A520 in the 10th embodiment pattern is defined as a 10th comparison data operation part A52010. The reference data is stored in the reference data storage part 620 of the comparison part A600.

In the manufacturing method SA and device A for animal excrement disposal materials according to the 10th embodiment pattern, a 10th comparison operation step S61010 is performed in the comparison operation part A610 of the comparison part A600. In the 10th comparison operation step S61010, first, as a first operation processing S610101, the individual sample surface area and the fixed numerical value of the reference surface area are inputted into the comparison operation part A610. Next, as a second operation processing S610102, it is determined whether or not the individual sample surface area is equal to the fixed numerical value of the reference surface area. At this time, the number of the individual samples are measured and stored. Further, the number of the individual samples whose surface area is equal to the fixed numerical value of the reference surface area, the number of the individual samples whose surface area is larger than the fixed numerical value of the reference surface area, and the number of the individual samples whose surface area is smaller than the fixed numerical value of the reference surface area are measured and stored. Furthermore, the number of the individual samples whose surface area is equal to the fixed numerical value of the reference surface area and the number of the individual samples whose surface area is not equal to the fixed numerical value of the reference surface area are measured and stored.

Next, as a third operation processing S610103, it is determined whether or not the number of the individual samples whose surface area has been compared with the reference surface area reaches a prescribed number. When this number of the compared individual samples does not reach the prescribed number, the second operation processing S610102 is performed until the number of the compared individual samples reaches the prescribed number. When the number of the compared individual samples reaches the prescribed number, a fourth operation processing S610104 is performed.

In the fourth operation processing S610104, the number of the individual samples whose surface area is equal to the fixed numerical value of the reference surface is compared. When the number of the individual samples whose surface area is equal to the fixed numerical value of the reference surface area equals or exceeds a prescribed number, the current sieve B110 of the sorting part A200 is determined to be appropriate. In this case, completion processing is performed in the fourth operation processing S610104. By the completion processing of the fourth operation processing S610104, the 10th comparison operation step S61010 is reset and the first operation processing S610101 is performed based on the next average sample surface area.

On the other hand, when the number of the individual samples whose surface area is equal to the fixed numerical value of the reference surface area is smaller than the prescribed number in the fourth operation processing S610104, a fifth operation processing S610105 is performed.

In the fifth operation processing S610105, the number of the individual samples whose surface area is larger than the fixed numerical value of the reference surface area is compared with the number of the individual samples whose surface area is smaller than the fixed numerical value of the reference surface area. When the number of the individual samples whose surface area is larger than the fixed numerical value of the reference surface area is smaller, it means that the surface area of the animal excrement disposal materials C100 is smaller than the desired surface area.

In this case, a sixth operation processing S610106 is subsequently performed. In the sixth operation processing S610106, it is indicated that the current sieve B110 of the sorting part A200 is to be replaced with the standby sieve B120 having a larger mesh size than the current sieve B110 in the sieve replacing part A700.

As a result, in the sieve replacing part A700, the current sieve B110 of the sorting part A200 can be replaced with the standby sieve B120 having a larger mesh size than the current sieve B110.

When it is determined in the fifth operation processing S610105 that the number of the individual samples whose surface area is larger than the fixed numerical value of the reference surface area is smaller, it means that the surface area of the animal excrement disposal materials C100 is larger than the desired surface area.

In this case, a seventh operation processing S610107 is subsequently performed. In the seventh operation processing S610107, it is indicated that the current sieve B110 of the sorting part A200 is to be replaced with the standby sieve B120 having a smaller mesh size than the current sieve B110 in the sieve replacing part A700.

As a result, in the sieve replacing part A700, the current sieve B110 of the sorting part A200 can be replaced with the standby sieve B120 having a smaller mesh size than the current sieve B110.

In this manner, in the manufacturing method SA and device A for animal excrement disposal materials according to the 10th embodiment pattern, the individual sample surface area and the reference surface area having a fixed numerical value are used as the comparison data and the reference data, respectively. Thus, the current sieve B110 of the sorting part A200 can be replaced with the standby sieve B120 having an appropriate mesh size. Therefore, the animal excrement disposal materials C100 having stable quality can be manufactured.

Further, in the 10th embodiment pattern, the determination is made based on the "number" of the measured individual samples, but it may also be made, for example, based on the "ratio" of the individual samples whose surface area is equal to the reference surface area, in all the measured individual samples, or the "ratio" of the individual samples whose surface area is larger than the reference surface area, to the individual samples whose surface area is smaller than the reference surface area.

Third Embodiment

The manufacturing method and device for animal excrement disposal materials according to the third embodiment of the present invention are explained with reference to FIGS. 29 to 34. The manufacturing method and device for animal excrement disposal materials according to the third embodiment are explained based on the 11th to 13th embodiment patterns.

In the third embodiment, a standard deviation is used as the comparison data which is obtained in the comparison data calculating part A500.

First, a step of obtaining the standard deviation of samples as the comparison data in the comparison data calculating part A500 is explained. The standard deviation of the samples is obtained based on prescribed unit numerical values of the samples.

As described above, the unit numerical value of the animal excrement disposal materials C100 is obtained in the unit numerical value measuring part A510 of the comparison data calculating part A500. At this time, the "particle size" is obtained as the unit numerical value. Further, other different unit numerical values of the animal excrement disposal materials C100 can be obtained by operation of the comparison data operation part A520.

In the comparison data operation part A520, the number of the samples whose "particle size" has been measured in the unit numerical value measuring part A510 is measured and stored. Further, in the comparison data operation part A520, a reference shape which is assumed as a prescribed shape is prepared having the shape of a sphere.

In the comparison data operation part A520, the "radius r of the sample" is obtained based on the particle size obtained in the comparison data calculating part A500. Therefore, in the comparison data operation part A520, the "radius" can be obtained as the unit numerical value of the sample.

Further, in the comparison data operation part A520, the radius r of the sample is assigned to the spherical reference shape, and the surface area of the sample is obtained based on the formula for calculating the surface area of a sphere ($=4\pi r^2$). Therefore, in the comparison data operation part A520, the "surface area" can be obtained as the unit numerical value of the sample.

Further, in the comparison data operation part A520, the volume of the sample can be obtained. Specifically, the radius r of the sample is assigned to the spherical reference shape and the volume of the sample is obtained based on the formula for calculating the volume of a sphere ($=4/3\cdot\pi r^3$). Therefore, in the comparison data operation part A520, the "volume" can be obtained as the unit numerical value of the sample.

Further, in the comparison data operation part A520, the weight (mass) of the sample is obtained from the volume of the sample. In this case, the specific gravity of the sample is inputted into the comparison data operation part A520. The weight of the sample is obtained by multiplying the volume of the sample by the specific gravity of the sample. Therefore, in the comparison data operation part A520, the "weight (mass)" can be obtained as the unit numerical value of the sample.

Further, in the comparison data operation part A520, the surface area of the sample can be divided by the weight of the sample, so that the surface area per unit weight of the sample is obtained. Therefore, in the comparison data operation part A520, the "surface area per unit weight" can be obtained as the unit numerical value of the sample.

Furthermore, in the comparison data operation part A520, the volume of the sample can be divided by the weight of the sample, so that the volume per unit weight of the sample is obtained. Therefore, in the comparison data operation part A520, the "volume per unit weight" can be obtained as the unit numerical value of the sample.

Specifically, as described above, in the comparison data calculating part A500, particle size, radius, surface area, volume, weight (mass), surface area per unit weight and volume per unit weight can be obtained as the "unit numerical value" of the sample. Further, the unit numerical value of the sample is referred to as a sample unit numerical value.

In the comparison data operation part A520, a standard deviation to be used as the comparison date is operated by obtaining a prescribed number of the sample unit numerical values.

When the standard deviation of the samples is operated from the prescribed unit numerical values of the samples, an average value of the prescribed unit numerical values can be obtained. The average value of the prescribed unit numerical values which is obtained by operating the standard deviation is referred to as an average sample unit numerical value.

In the comparison data calculating step, a value obtained by dividing the standard deviation by the average sample unit numerical value may also be used as the comparison data.

Further, the average sample unit numerical value may be used as part of the comparison data. In such a case, the standard deviation forms a first comparison data, and the "average value of the prescribed unit numerical values" forms a second comparison data.

The reference data is an arbitrarily prescribed numerical value for determining whether the comparison data is appropriate or not. The reference data has a prescribed numerical range. The reference data is inputted and stored in the reference data storage part A620 of the comparison part A600.

Further, when the comparison data has the first comparison data and the second comparison data, the reference data also has first reference data and second reference data. The first reference data is a prescribed numerical value for determining whether the first comparison data is appropriate or not. The second reference data is a prescribed numerical value for determining whether the second comparison data is appropriate or not.

(11th Embodiment Pattern)

Figure 29:
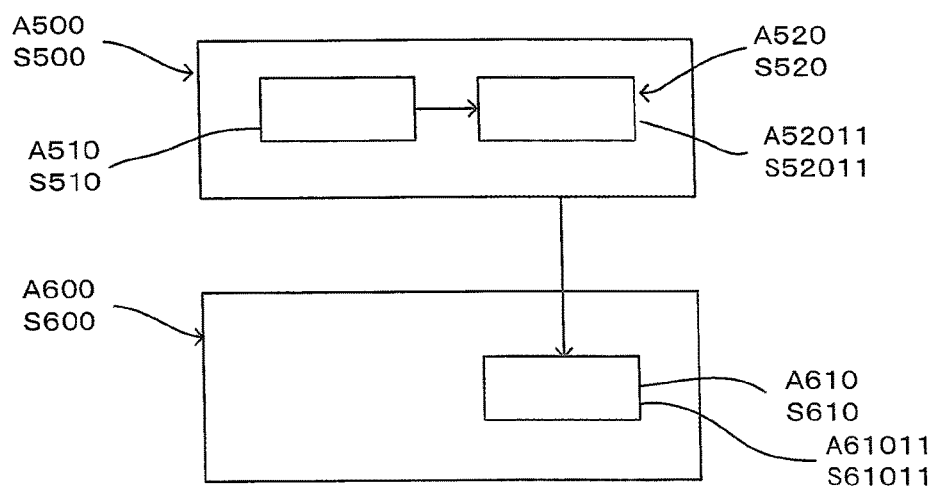
FIG. 29 is a block diagram showing an 11th embodiment pattern according to the present invention.
Figure 30:
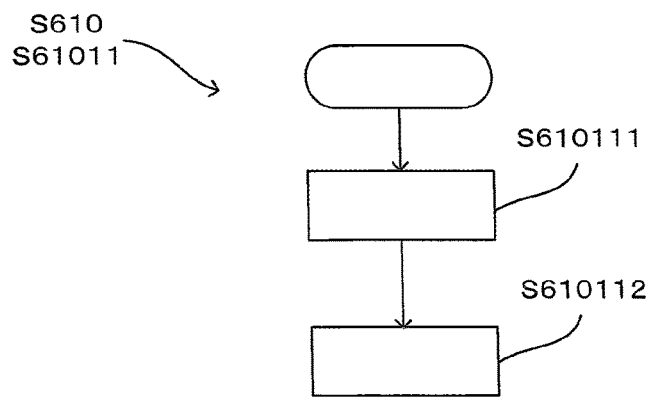
FIG. 30 is a flow chart showing the 11th embodiment pattern.

The manufacturing method SA and device A for animal excrement disposal materials according to the 11th embodiment pattern are explained with reference to FIGS. 29 and 30. The comparison data is obtained in the comparison data operation part A520 of the comparison data calculating part A500.

The comparison data may be a standard deviation based on the prescribed unit numerical values of the samples, or it may be a value obtained by dividing the standard deviation by the average sample unit numerical value. The comparison data operation part A520 in the 11th embodiment pattern is defined as an 11th comparison data operation part A52011.

In the manufacturing method SA and device A for animal excrement disposal materials according to the 11th embodiment pattern, an 11th comparison operation step S61011 is performed in the comparison operation part A610 of the comparison part A600. In the 11th comparison operation step S61011, first, as a first operation processing S6160111, the comparison data is inputted into the comparison operation part A610. Next, as a second operation processing S610112, the comparison data is transmitted to the sieve replacing part A700. As a result, the operator can grasp the state of the current sieve B110 of the sorting part A200 from the comparison data. Further, when the operator determines from the comparison data that the current sieve B110 is not appropriate, the operator can replace the current sieve B110 with the standby sieve B120.

In this manner, in the manufacturing method SA and device A for animal excrement disposal materials according to the 11th embodiment pattern, the current sieve B110 of the sorting part A200 can be replaced with the standby sieve B120 based on the comparison data. Therefore, the animal excrement disposal materials C100 having stable quality can be manufactured.

(12th Embodiment Pattern)

Figure 31:
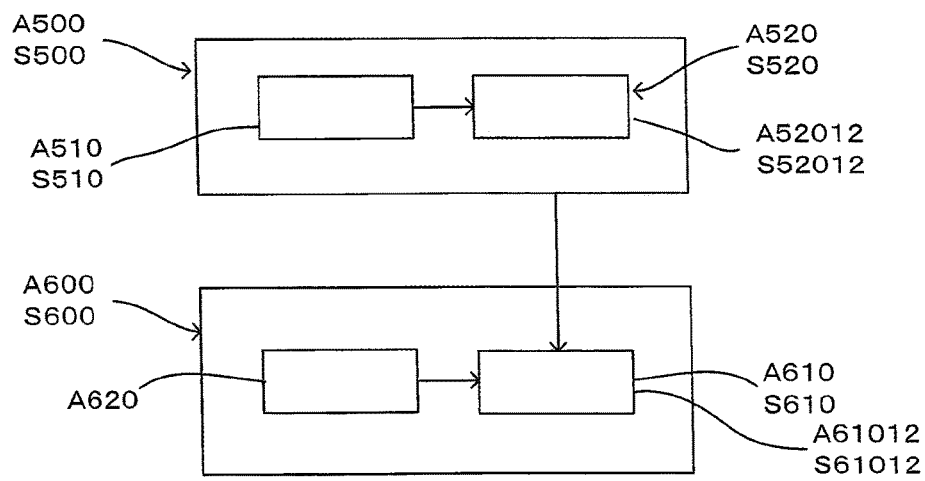
FIG. 31 is a block diagram showing a 12th embodiment pattern according to the present invention.
Figure 32:
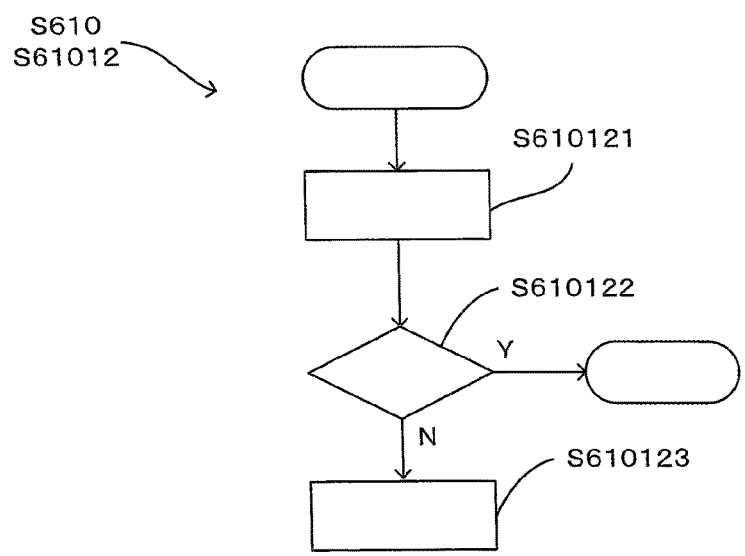
FIG. 32 is a flow chart showing the 12th embodiment pattern.

The manufacturing method SA and device A for animal excrement disposal materials according to the 12th embodiment pattern are explained with reference to FIGS. 31 and 32. In the 12th embodiment pattern, the comparison data is obtained in the comparison data operation part A520 of the comparison data calculating part A500. Further, the comparison data may be a standard deviation based on the prescribed unit numerical values of the samples, or it may be a value obtained by dividing the standard deviation by the average sample unit numerical value. The comparison data operation part A520 in the 12th embodiment pattern is defined as a 12th comparison data operation part A52012.

The reference data is stored in the reference data storage part A620 of the comparison part A600.

In the manufacturing method SA and device A for animal excrement disposal materials according to the 12th embodiment pattern, a 12th comparison operation step S61012 is performed in the comparison operation part A610 of the comparison part A600. In the 12th comparison operation step S61012, first, as a first operation processing S610121, the comparison data and the reference data having a prescribed numerical range are inputted into the comparison operation part A610. Next, as a second operation processing S610122, it is determined whether or not the comparison data falls within the prescribed numerical range of the reference data. When it is determined in the second operation processing S610122 that the comparison data falls within the prescribed numerical range of the reference data, completion processing is performed. By the completion processing of the second operation processing S610122, the 12th comparison operation step S61012 is reset and the first operation processing S610121 is performed based on the next comparison data.

On the other hand, when it is determined in the second operation processing S610122 that the comparison data does not fall within the prescribed numerical range of the reference data, a third operation processing S610123 is performed. In the third operation processing S610123, it is indicated to the sieve replacing part A700 that the current sieve B110 needs to be replaced with the standby sieve B120.

As a result, in the sieve replacing part A700, the current sieve B110 of the sorting part A200 can be replaced with the standby sieve B120.

In this manner, in the manufacturing method SA and device A for animal excrement disposal materials according to the 12th embodiment pattern, the current sieve B110 of the sorting part A200 can be replaced with the standby sieve B120 based on the comparison data. Therefore, the animal excrement disposal materials C100 having stable quality can be manufactured.

(13th Embodiment Pattern)

Figure 33:
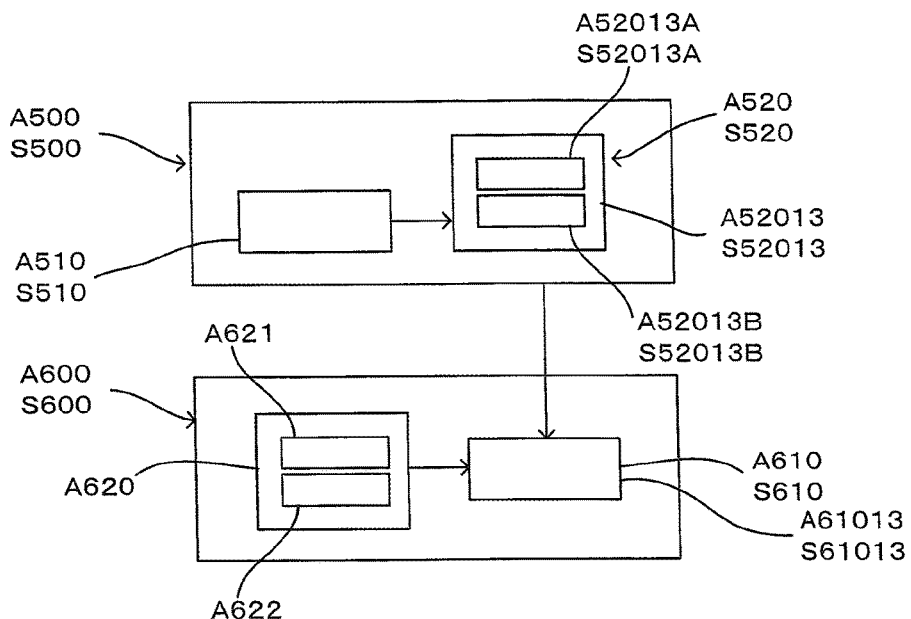
FIG. 33 is a block diagram showing a 13th embodiment pattern according to the present invention.
Figure 34:
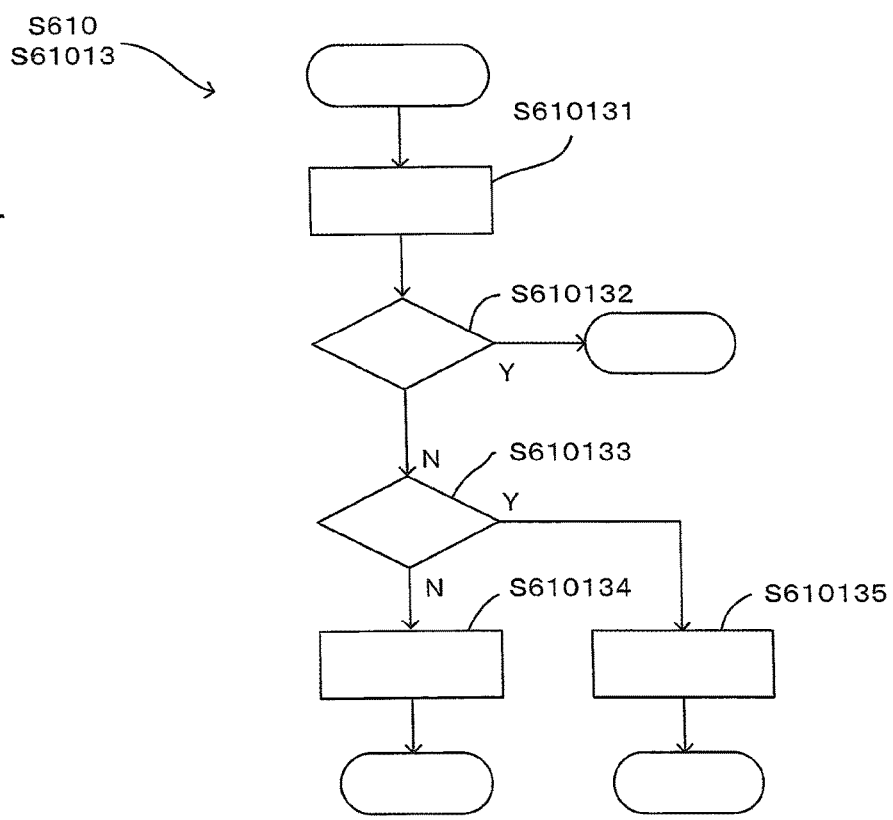
FIG. 34 is a flow chart showing the 13th embodiment pattern.

The manufacturing method SA and device A for animal excrement disposal materials according to the 13th embodiment pattern are explained with reference to FIGS. 33 and 34. In the 13th embodiment pattern, the first comparison data and the second comparison data are used as the comparison data. Further, the first comparison data may be a standard deviation based on the prescribed unit numerical values of the samples, or it may be a value obtained by dividing the standard deviation by the average sample unit numerical value.

Further, the first reference data and the second reference data are used as the reference data. In this case, the first reference data is numerical data having a prescribed numerical range for determining whether the first comparison data is appropriate or not, and the second reference data is numerical data having a single numerical value (not having a numerical range) for determining whether the second comparison data is appropriate or not.

The first comparison data and the second comparison data are obtained in the comparison data operation part A520 of the comparison data calculating part A500. The comparison data operation part A520 in the 13th embodiment pattern is defined as a 13th comparison data operation part A52013. The reference data is stored in the reference data storage part A620 of the comparison part A600.

In the manufacturing method SA and device A for animal excrement disposal materials according to the 13th embodiment pattern, a 13th comparison operation step S61013 is performed in the comparison operation part A610 of the comparison part A600. In the 13th comparison operation step S61013, first, as a first operation processing S610131, the first comparison data, the second comparison data, the first reference data and the second reference data are inputted into the comparison operation part A610. Next, as a second operation processing S610132, it is determined whether or not the first comparison data falls within the numerical range of the first reference data. When it is determined in the second operation processing S610132 that the first comparison data falls within the numerical range of the first reference data, completion processing is performed. By the completion processing of the second operation processing S610132, the 13th comparison operation step S61013 is reset and the next first operation processing S610131 is performed.

On the other hand, when it is determined in the second operation processing S610132 that the first comparison data does not fall within the numerical range of the first reference data, a third operation processing S610133 is performed.

In the third operation processing S610133, it is determined whether or not the second comparison data is larger than the second reference data. When it is determined that the second comparison data is smaller than the second reference data, it means that the size of the animal excrement disposal materials C100 is smaller than the desired size.

In this case, a fourth operation processing S610134 is subsequently performed. In the fourth operation processing S610134, it is indicated to the sieve replacing part A700 that the current sieve B110 needs to be replaced with the standby sieve B120 having a larger mesh size than the current sieve B110.

As a result, in the sieve replacing part A700, the current sieve B110 of the sorting part A200 can be replaced with the standby sieve B120 having a larger mesh size than the current sieve B110.

When it is determined in the third operation processing S610133 that the second comparison data is larger than the second reference data, it means that the size of the animal excrement disposal materials C100 is larger than the desired size.

In this case, a fifth operation processing S610135 is subsequently performed. In the fifth operation processing S610135, it is indicated to the sieve replacing part A700 that the current sieve B110 needs to be replaced with the standby sieve B120 having a smaller mesh size than the current sieve B110.

As a result, in the sieve replacing part A700, the current sieve B110 of the sorting part A200 can be replaced with the standby sieve B120 having a smaller mesh size than the current sieve B110.

In this manner, in the manufacturing method SA and device A for animal excrement disposal materials according to the 13th embodiment pattern, the current sieve B110 of the sorting part A200 can be replaced with the standby sieve B120 having an appropriate mesh size. Therefore, the animal excrement disposal materials C100 having stable quality can be manufactured.

Fourth Embodiment

The manufacturing method and device for animal excrement disposal materials according to the fourth embodiment of the present invention are explained with reference to FIGS. 35 and 36. The manufacturing method and device for animal excrement disposal materials according to the fourth embodiment are explained based on the 14th embodiment pattern.

In the fourth embodiment, a mixture quality control part A303 for performing quality control of the mixture of the first and second animal excrement disposal materials is provided in the mixing part A810.

(14th Embodiment Pattern)

The 14th embodiment pattern is explained with reference to FIGS. 35 and 36. In a fifth manufacturing device A5 of the 14th embodiment pattern, a plurality of the sorting parts A200 are provided for the single granulating part A100. The fifth manufacturing device A5 performs a fifth manufacturing method SA5.

Figure 35:
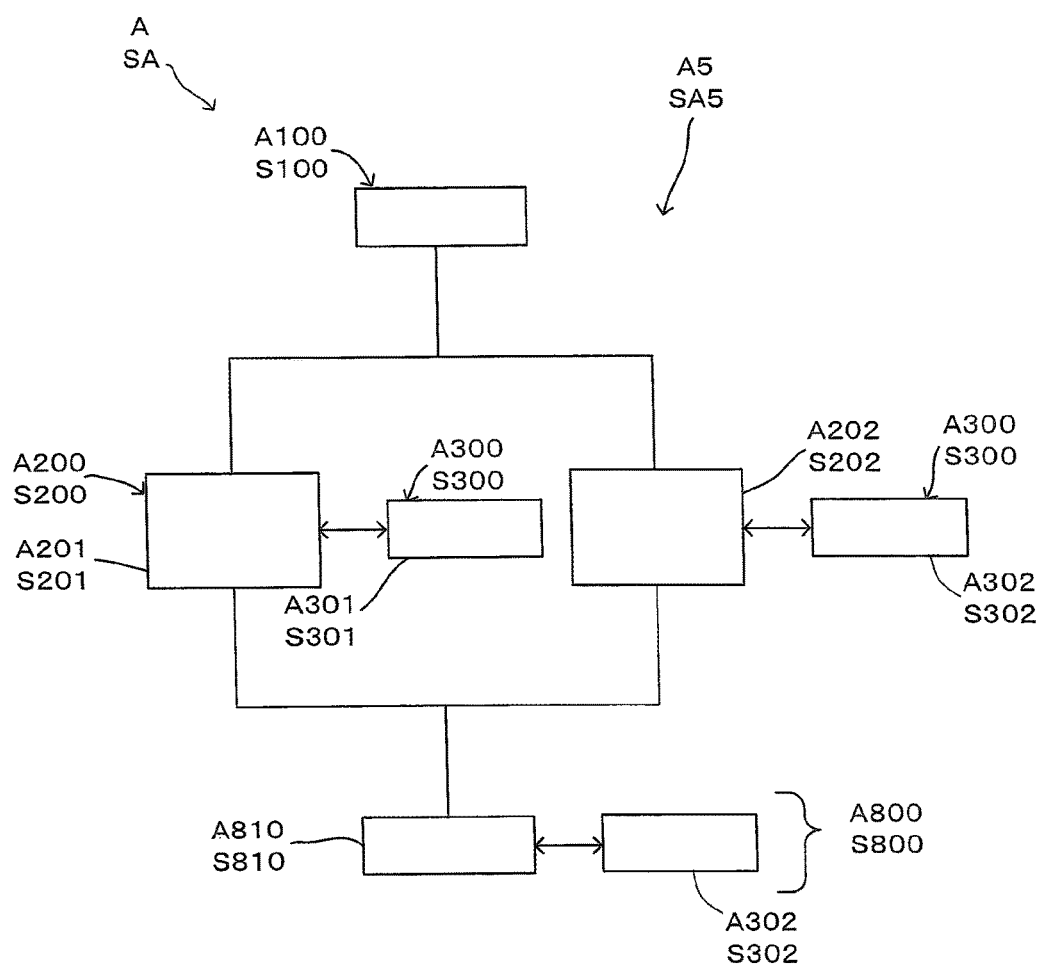
FIG. 35 is a block diagram showing a 14th embodiment pattern according to the present invention.
Figure 36:
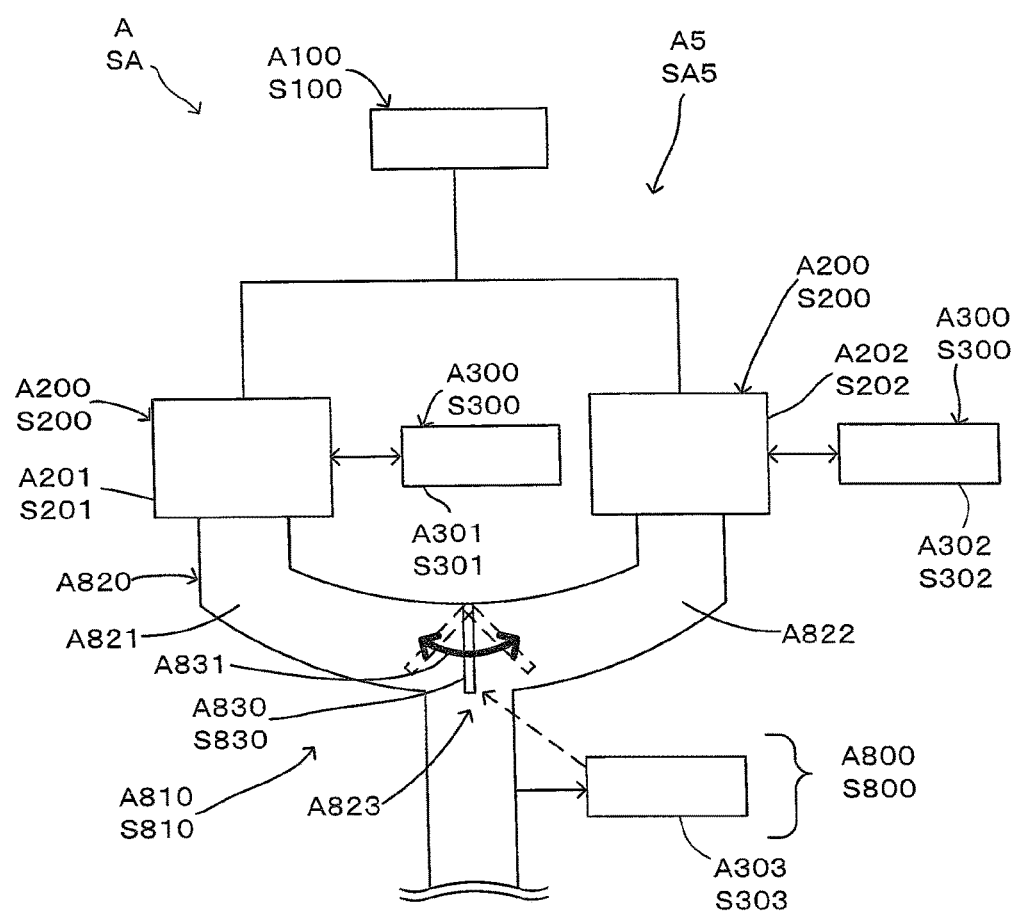
FIG. 36 is a schematic view showing the 14th embodiment pattern.

In FIGS. 35 and 36, the first sorting part A201 and the second sorting part A202 are provided as the sorting part A200, but three or more sorting parts A200 may be provided. The sorting parts A200 are provided with the respective current sieves having different mesh size from each other. In the 14th embodiment pattern, the current sieve of the first sorting part A201 has a larger mesh size than the current sieve of the second sorting part A202.

Further, as described above, the first sorting part A201 and the second sorting part A202 have the first quality control part A301 and the second quality control part A302, respectively, as the quality control part A300. The structure of the quality control part A300 according to the above-described first to 13th embodiment patterns is appropriately applied to the first quality control part A301 and the second quality control part A302.

The mixing part 810 of the final processing part A800 has the mixture quality control part A303. The mixture quality control part A303 performs a mixture quality control step S303. The mixture quality control part A303 determines whether or not the mixture of the animal excrement disposal materials obtained in the sorting parts A200 is appropriate. Specifically, in the 14th embodiment pattern, the mixture quality control part A303 determines whether or not the mixture of the first animal excrement disposal materials obtained in the first sorting part A201 and the second animal excrement disposal materials obtained in the second sorting part A202 is appropriate.

As shown in FIG. 36, the animal excrement disposal materials obtained in the sorting part A200 pass through a passage A820. The passage A820 has a first passage A821 through which the first animal excrement disposal materials obtained in the first sorting part A201 pass, a second passage A822 through which the second animal excrement disposal materials obtained in the second sorting part A202 pass, and a confluent passage A823 through which a mixture of the first animal excrement disposal materials and the second animal excrement disposal materials pass.

A flow control part A830 is formed at a confluent part between the first and second passages A821, A822. The flow control part A830 performs a flow control step S830. The flow control part A830 adjusts the mixing ratio of the first animal excrement disposal materials and the second animal excrement disposal materials to be a ratio of other than one to one such that the ratio of the first animal excrement disposal materials is higher or lower than the ratio of the second animal excrement disposal materials. Further, the flow control part A830 can also adjust the mixing ratio of the first animal excrement disposal materials and the second animal excrement disposal materials to be one to one.

The flow control part A830 can be formed by a plate-like member disposed at the confluent part between the first and second passages A821, A822. In this case, the flow control part A830 is configured to be capable of swinging, with a point facing the confluent passage A823 in the confluent part as a supporting point, in a direction toward the first passage A821 and a direction toward the second passage A822 as shown by arrow A831. Further, even when the flow control part A830 is moved to either position, the flow control part A830 does not completely block the first or second passage A821, A822.

When the flow control part A830 is moved toward the first passage 821, the first animal excrement disposal materials come in contact with the flow control part A830, so that the amount of the first animal excrement disposal materials passing through into the confluent passage A823 decreases. Therefore, in the confluent passage A823, the ratio of the first animal excrement disposal materials becomes smaller than the ratio of the second animal excrement disposal materials. Contrarily, when the flow control part A830 is moved toward the second passage A822, the second animal excrement disposal materials come in contact with the flow control part A830, so that the amount of the second animal excrement disposal materials passing through into the confluent passage A823 decreases. Therefore, in the confluent passage A823, the ratio of the first animal excrement disposal materials becomes larger than the second animal excrement disposal materials.

Further, as for the flow control part A830, any structure other than the above-described structure may also be selected.

The mixture quality control part A303 determines whether or not the mixture of the first and second animal excrement disposal materials is appropriate in the confluent passage A823 and accordingly adjusts the position of the flow control part A830. Specifically, the mixture quality control part A303 controls the flow rates of the first animal excrement disposal materials and the second animal excrement disposal materials.

The mixture quality control part A303 has a mixture extracting part (not shown), a mixture comparison data calculating part (not shown) and a flow control part adjusting part (not shown). The mixture extracting part, the mixture comparison data calculating part and the flow control part adjusting part perform a mixture extracting step, a mixture comparison data calculating step and a flow control part adjusting step, respectively.

Further, the mixture quality control part A303 may also have a mixture comparison part (not shown). The mixture comparison part performs a mixture comparing step.

The structures described above in the general basic embodiment and the first to 13th embodiment patterns may be appropriately applied to the mixture extracting part, the mixture comparison data calculating part and the mixture comparison part. Specifically, the structures of the extraction part A400, the comparison data calculating part A500 and the comparison part A600 may be applied to the structures of the mixture extracting part, the mixture comparison data calculating part and the mixture comparison part, respectively.

Further, the flow control part adjusting part may be configured to correspond or be equivalent to the sieve replacing part A700 described above in the general basic embodiment and the first to 13th embodiment patterns. Specifically, the flow control part adjusting part is provided to change the position of the flow control part A830, while the sieve replacing part A700 is provided to replace the current sieve with the standby sieve.

In the mixture quality control part having the above-described structure, the position of the flow control part A830 can be manually or automatically adjusted based on the result of measurement of the mixture of the first and second animal excrement disposal materials.

Therefore, the animal excrement disposal materials having stable quality can be manufactured.

The manufacturing method SA and device A for animal excrement disposal materials according to the present invention are not limited to those described above. The structures of the above-described first to 14th embodiment patterns can be appropriately used in combination or modified.

As for a structure for executing arithmetic operation according to the present invention, such as the comparison data operation part A520 and the comparison operation part A610, a known structure with an arithmetic function can be appropriately selected.

(Correspondences Between the Features of the Embodiment and the Features of the Invention)

The animal excrement disposal material C100 is an example embodiment that corresponds to the "animal excrement disposal material" according to the present invention. The method SA for manufacturing animal excrement disposal materials is an example embodiment that corresponds to the "method for manufacturing animal excrement disposal materials" according to the present invention. The granulating step S100 is an example embodiment that corresponds to the "granulating step" according to the present invention. The granule is an example embodiment that corresponds to the "granule" according to the present invention. The sorting step S200 and the quality control step S300 are example embodiments that correspond to the "sorting step" and the "quality control step", respectively, according to the present invention. The quality control equipment is an example embodiment that corresponds to the "quality control equipment" according to the present invention. The extracting step S400, the comparison data calculating step S500 and the comparing step S600 are example embodiments that correspond to the "extracting step", the "comparison data calculating step" and the "comparing step", respectively, according to the present invention. The determination is an example embodiment that corresponds to the "determination" according to the present invention. The sieve replacing step S700 is an example embodiment that corresponds to the "sieve replacing step" according to the present invention. The sieve B100, the current sieve B110 and the standby sieve B120 are example embodiments that correspond to the "sieve", the "current sieve" and the "standby sieve", respectively, according to the present invention. The device A for manufacturing animal excrement disposal materials is an example embodiment that corresponds to the "device for manufacturing animal excrement disposal materials" according to the present invention. The granulating part A100, the sorting part A200, the quality control part A300, the extracting part A400, the comparison data calculating part A500, the comparison part A600 and the sieve replacing part A700 are example embodiments that correspond to the "granulating part", the "sorting part", the "quality control part", the "extracting part", the "comparison data calculating part", the "comparison part" and the "sieve replacing part", respectively, according to the present invention.

In view of the nature of the above-described invention, various features can be provided as follows.

(Aspect 1)

A method for manufacturing animal excrement disposal materials, comprising:

a granulating step of granulating a raw material into granules, a sorting step of sorting the granules with a sieve having a prescribed mesh size to thereby obtain the animal excrement disposal materials, and a quality control step using quality control equipment, the quality control step including:

an extracting step of extracting a sample to be measured from the animal excrement disposal materials, a comparison data calculating step of obtaining a surface area per unit weight of the sample as comparison data, and a sieve replacing step of replacing the sieve based on the comparison data.

(Aspect 2)

The manufacturing method as defined in aspect 1, wherein a surface area per unit weight of a prescribed numerical value is provided as reference data in the quality control step, and the quality control step includes a comparing step of comparing the comparison data with the reference data.

(Aspect 3)

The manufacturing method as defined in aspect 1 or 2, wherein:

the sieve includes a current sieve being in use in the sorting step and a standby sieve having a different mesh size from the current sieve, and the current sieve is replaced with the standby sieve in the sieve replacing step.

(Aspect 4)

The manufacturing method as defined in aspect 3, wherein, when it is determined in the comparing step that the comparison data is smaller than the reference data, the current sieve is replaced with the standby sieve having a larger mesh size than the current sieve in the sieve replacing step.

(Aspect 5)

The manufacturing method as defined in aspect 3, wherein, when it is determined in the comparing step that the comparison data is larger than the reference data, the current sieve is replaced with the standby sieve having a smaller mesh size than the current sieve in the sieve replacing step.

(Aspect 6)

The manufacturing method as defined in any one of aspects 1 to 5, wherein the reference data has a numerical range of the prescribed numerical value.

(Aspect 7)

The manufacturing method as defined in any one of aspects 1 to 5, wherein the reference data does not have a numerical range of the prescribed numerical value.

(Aspect 8)

The manufacturing method as defined in any one of aspects 1 to 7, wherein the comparison data calculating step has a step of storing a reference shape assumed as a prescribed shape, a step of storing a specific gravity of the sample, a step of measuring a particle size of the sample, a step of calculating a surface area and a volume of the sample by assigning the particle size to the reference shape, a step of calculating a mass of the sample from the volume and the specific gravity and a step of calculating the comparison data from the surface area and the mass.

(Aspect 9)

The manufacturing method as defined in aspect 8, wherein the reference shape is a sphere.

(Aspect 10)

The manufacturing method as defined in any one of aspects 1 to 9, wherein a plurality of the samples are obtained in the extracting step.

(Aspect 11)

The manufacturing method as defined in aspect 10, wherein an average of the comparison data or average comparison data is obtained in the comparison data calculating step, and the average comparison data is compared with the reference data in the comparing step.

(Aspect 12)

The manufacturing method as defined in aspect 10, wherein the comparison data of each sample or individual comparison data is obtained in the comparison data calculating step, and the individual comparison data is compared with the reference data in the comparing step.

(Aspect 13)

The manufacturing method as defined in any one of aspects 1 to 12, wherein the sieve is associated with the specific reference data.

(Aspect 14)

The manufacturing method as defined in any one of aspects 1 to 13, wherein:

the sorting step includes a first sorting step and a second sorting step, and a first current sieve is provided in the first sorting step and a second current sieve is provided in the second sorting step, the first and second current sieves being associated with the reference data different from each other, further comprising:

as a step following the sorting step, a mixing step of mixing the animal excrement disposal materials or first and second animal excrement disposal materials obtained respectively in the first and second sorting steps.

(Aspect 15)

The manufacturing method as defined in aspect 14, wherein the first sorting step and the second sorting step can be simultaneously performed.

(Aspect 16)

The manufacturing method as defined in aspect 14, comprising a storing step of storing the first animal excrement disposal materials, wherein the first animal excrement disposal materials stored in the storing step and the second animal excrement disposal materials are mixed in the mixing step.

(Aspect 17)

The manufacturing method as defined in any one of aspects 14 to 16, wherein:

the mixing step includes a flow control step of controlling flow rates of the first animal excrement disposal materials and the second animal excrement disposal materials, and a mixture quality control step of controlling quality of the mixture of the first animal excrement disposal materials and the second animal excrement disposal materials, and the flow control step is performed based on a control result obtained in the mixture quality control step.

(Aspect 18)

A device for manufacturing animal excrement disposal materials, comprising:

a granulating part for granulating a raw material into granules, a sorting part for sorting the granules with a sieve having a prescribed mesh size to thereby obtain the animal excrement disposal materials, and a quality control part using quality control equipment, the quality control part including:

an extracting part for extracting a sample to be measured from the animal excrement disposal materials, a comparison data calculating part for obtaining a surface area per unit weight of the sample as comparison data, and a sieve replacing part for replacing the sieve based on the comparison data.

(Aspect 19)

The manufacturing device as defined in aspect 18, wherein a surface area per unit weight of a prescribed numerical value is provided as reference data in the quality control part, and the quality control part includes a comparison part for comparing the comparison data with the reference data.

(Aspect 20)

The manufacturing device as defined in aspect 18 or 19, wherein:

the sieve includes a current sieve being in use in the sorting part and a standby sieve having a different mesh size from the current sieve, and the current sieve is replaced with the standby sieve in the sieve replacing part.

(Aspect 21)

A method for manufacturing animal excrement disposal materials, comprising:

a granulating step of granulating a raw material into granules, a sorting step of sorting the granules with a sieve having a prescribed mesh size to thereby obtain the animal excrement disposal materials, and a quality control step using quality control equipment, the quality control step including:

an extracting step of extracting a sample to be measured from the animal excrement disposal materials, a comparison data calculating step of obtaining a surface area of the sample as comparison data, and a sieve replacing step of replacing the sieve based on the comparison data.

(Aspect 22)

The manufacturing method as defined in aspect 21, wherein a surface area of a prescribed numerical value is provided as reference data in the quality control step, and the quality control step includes a comparing step of comparing the comparison data with the reference data.

(Aspect 23)

The manufacturing method as defined in aspect 21 or 22, wherein:

the sieve includes a current sieve being in use in the sorting step and a standby sieve having a different mesh size from the current sieve, and the current sieve is replaced with the standby sieve in the sieve replacing step.

(Aspect 24)

The manufacturing method as defined in aspect 23, wherein, when it is determined in the comparing step that the comparison data is smaller than the reference data, the current sieve is replaced with the standby sieve having a larger mesh size than the current sieve in the sieve replacing step.

(Aspect 25)

The manufacturing method as defined in aspect 23, wherein, when it is determined in the comparing step that the comparison data is larger than the reference data, the current sieve is replaced with the standby sieve having a smaller mesh size than the current sieve in the sieve replacing step.

(Aspect 26)

The manufacturing method as defined in any one of aspects 21 to 25, wherein the reference data has a numerical range of the prescribed numerical value.

(Aspect 27)

The manufacturing method as defined in any one of aspects 21 to 25, wherein the reference data does not have a numerical range of the prescribed numerical value.

(Aspect 28)

The manufacturing method as defined in any one of aspects 21 to 27, wherein the comparison data calculating step has a step of storing a reference shape assumed as a prescribed shape, a step of measuring a particle size of the sample, and a step of calculating the comparison data by assigning the particle size to the reference shape.

(Aspect 29)

The manufacturing method as defined in aspect 28, wherein the reference shape is a sphere.

(Aspect 30)

The manufacturing method as defined in any one of aspects 21 to 29, wherein a plurality of the samples are obtained in the extracting step.

(Aspect 31)

The manufacturing method as defined in aspect 30, wherein an average of the comparison data or average comparison data is obtained in the comparison data calculating step, and the average comparison data is compared with the reference data in the comparing step.

(Aspect 32)

The manufacturing method as defined in aspect 30, wherein the comparison data of each sample or individual comparison data is obtained in the comparison data calculating step, and the individual comparison data is compared with the reference data in the comparing step.

(Aspect 33)

The manufacturing method as defined in any one of aspects 21 to 32, wherein the sieve is associated with the specific reference data.

(Aspect 34)

The manufacturing method as defined in any one of aspects 21 to 33, wherein:

the sorting step includes a first sorting step and a second sorting step, a first current sieve is provided in the first sorting step, and a second current sieve is provided in the second sorting step, the first and second current sieves being associated with the reference data different from each other, further comprising:

as a step following the sorting step, a mixing step of mixing the animal excrement disposal materials or first and second animal excrement disposal materials obtained respectively in the first and second sorting steps.

(Aspect 35)

The manufacturing method as defined in aspect 34, wherein the first sorting step and the second sorting step can be simultaneously performed.

(Aspect 36)

The manufacturing method as defined in aspect 34, comprising a storing step of storing the first animal excrement disposal materials, wherein the first animal excrement disposal materials stored in the storing step and the second animal excrement disposal materials are mixed in the mixing step.

(Aspect 37)

The manufacturing method as defined in any one of aspects 34 to 36, wherein:

the mixing step includes a flow control step of controlling flow rates of the first animal excrement disposal materials and the second animal excrement disposal materials and a mixture quality control step of controlling quality of the mixture of the first animal excrement disposal materials and the second animal excrement disposal materials, and the flow control step is performed based on a control result obtained in the mixture quality control step.

(Aspect 38)

A device for manufacturing animal excrement disposal materials, comprising:

a granulating part for granulating a raw material into granules, a sorting part for sorting the granules with a sieve having a prescribed mesh size to thereby obtain the animal excrement disposal materials, and a quality control part using quality control equipment,
the quality control part including:
an extracting part for extracting a sample to be measured from the animal excrement disposal materials,
a comparison data calculating part for obtaining a surface area of the sample as comparison data, and
a sieve replacing part for replacing the sieve based on the comparison data.

(Aspect 39)
The manufacturing device as defined in aspect 38, wherein a surface area of a prescribed numerical value is provided as reference data in the quality control part, and the quality control part includes a comparison part for comparing the comparison data with the reference data.

(Aspect 40)
The manufacturing device as defined in aspect 38 or 39, wherein:
the sieve includes a current sieve being in use in the sorting part and a standby sieve having a different mesh size from the current sieve, and
the current sieve is replaced with the standby sieve in the sieve replacing part.

(Aspect 41)
A manufacturing method for manufacturing animal excrement disposal materials, comprising:
a granulating step of granulating a raw material into granules,
a sorting step of sorting the granules with a sieve having a prescribed mesh size to thereby obtain the animal excrement disposal materials, and
a quality control step using quality control equipment,
the quality control step including:
an extracting step of extracting samples to be measured from the animal excrement disposal materials,
a comparison data calculating step of obtaining a plurality of unit numerical values by measuring a prescribed unit of measurement of the samples and obtaining a standard deviation as comparison data from the unit numerical values, and
a sieve replacing step of replacing the sieve based on the comparison data.

(Aspect 42)
The manufacturing method as defined in aspect 41, wherein an average of the unit numerical values or an average sample unit numerical value is calculated in the comparison data calculating step.

(Aspect 43)
The manufacturing method as defined in aspect 41 or 42, wherein the comparison data is obtained by dividing the standard deviation by the average sample unit numerical value.

(Aspect 44)
The manufacturing method as defined in any one of aspects 41 to 43, wherein a prescribed numerical value for determining whether the comparison data is appropriate or not is provided as reference data in the quality control step, and the quality control step includes a comparing step of comparing the comparison data with the reference data.

(Aspect 45)
The manufacturing method as defined in any one of aspects 41 to 44, wherein:
the sieve includes a current sieve being in use in the sorting step and a standby sieve having a different mesh size from the current sieve, and
the current sieve is replaced with the standby sieve in the sieve replacing step.

(Aspect 46)
The manufacturing method as defined in any one of aspects 41 to 45, wherein:
the comparison data includes first comparison data being the standard deviation and second comparison data being the average sample unit numerical value,
the reference data includes first reference data being a prescribed numerical value for determining whether the first comparison data is appropriate or not, and second reference data being a prescribed numerical value for determining whether the second comparison data is appropriate or not, and
in the comparing step, the first comparison data is compared with the first reference data and the second comparison data is compared with the second reference data.

(Aspect 47)
The manufacturing method as defined in aspect 46, wherein, when it is determined in the comparing step that the second comparison data is smaller than the second reference data, the current sieve is replaced with the standby sieve having a larger mesh size than the current sieve in the sieve replacing step.

(Aspect 48)
The manufacturing method as defined in aspect 46, wherein, when it is determined in the comparing step that the second comparison data is larger than the second reference data, the current sieve is replaced with the standby sieve having a smaller mesh size than the current sieve in the sieve replacing step.

(Aspect 49)
The manufacturing method as defined in any one of aspects 41 to 48, wherein the comparison data calculating step has a step of storing a reference shape assumed as a prescribed shape, a step of measuring a particle size of the sample, and a step of calculating the unit numerical value by assigning the particle size to the reference shape.

(Aspect 50)
The manufacturing method as defined in aspect 49, wherein the reference shape is a sphere.

(Aspect 51)
The manufacturing method as defined in any one of aspects 41 to 50, wherein the sieve is associated with the specific reference data.

(Aspect 52)
The manufacturing method as defined in any one of aspects 41 to 51, wherein:
the sorting step includes a first sorting step and a second sorting step,
a first current sieve is provided in the first sorting step and a second current sieve is provided in the second sorting step, the first and second current sieves being associated with the reference data different from each other,
further comprising:
as a step following the sorting step, a mixing step of mixing the animal excrement disposal materials or first and second animal excrement disposal materials obtained respectively in the first and second sorting steps.

(Aspect 53)
The manufacturing method as defined in aspect 52, wherein the first sorting step and the second sorting step can be simultaneously performed.

(Aspect 54)
The manufacturing method as defined in aspect 52, comprising a storing step of storing the first animal excrement disposal materials, wherein the first animal excrement disposal materials stored in the storing step and the second animal excrement disposal materials are mixed in the mixing step.

(Aspect 55)

The manufacturing method as defined in any one of aspects 52 to 54, wherein:

the mixing step includes a flow control step of controlling flow rates of the first animal excrement disposal materials and the second animal excrement disposal materials and a mixture quality control step of controlling quality of the mixture of the first animal excrement disposal materials and the second animal excrement disposal materials, and the flow control step is performed based on a control result obtained in the mixture quality control step.

(Aspect 56)

A device for manufacturing animal excrement disposal materials, comprising:

a granulating part for granulating a raw material into granules, a sorting part for sorting the granules with the sieve having a prescribed mesh size to thereby obtain the animal excrement disposal materials, and a quality control part using quality control equipment, the quality control part including:

an extracting part for extracting samples to be measured from the animal excrement disposal materials, a comparison data calculating part for obtaining a plurality of unit numerical values by measuring a prescribed unit of measurement of the samples and obtaining a standard deviation as comparison data from the unit numerical values, and a sieve replacing part for replacing the sieve based on the comparison data.

(Aspect 57)

The manufacturing device as defined in aspect 56, wherein an average of the unit numerical values or an average sample unit numerical value is calculated in the comparison data calculating part.

(Aspect 58)

The manufacturing device as defined in aspect 56 or 57, wherein the comparison data is obtained by dividing the standard deviation by the average sample unit numerical value.

(Aspect 59)

The manufacturing device as defined in any one of aspects 56 to 58, wherein a prescribed numerical value for determining whether the comparison data is appropriate or not is provided as reference data in the quality control part, and the quality control part has a comparison part for comparing the comparison data with the reference data.

(Aspect 60)

The manufacturing device as defined in any one of aspects 56 to 59, wherein the sieve includes a current sieve being in use in the sorting part and a standby sieve having 5 a different mesh size from the current sieve, and the current sieve is replaced with the standby sieve in the sieve replacing part.

DESCRIPTION OF THE NUMERALS

A manufacturing device
A1 first manufacturing device
A2 second manufacturing device
A3 third manufacturing device
A4 fourth manufacturing device
A5 fifth manufacturing device
AA first granule obtaining part
AB second granule obtaining part
A100 granulating part
A101 first granulating part
A102 second granulating part
A200 sorting part
A201 first sorting part
A202 second sorting part
A300 quality control part
A301 first quality control part
A302 second quality control part
A303 third quality control part
A400 extracting part
A500 comparison data calculating part
A510 unit numerical value measuring part
A511 first unit numerical value measuring part
A512 second unit numerical value measuring part
A5121 first measuring sieve
A5122 second measuring sieve
A5123 third measuring sieve
A512$n$ n-th measuring sieve
A520 comparison data operation part
A521 first comparison data operation part
A522 second comparison data operation part
A523 third comparison data operation part
A524 fourth comparison data operation part
A525 fifth comparison data operation part
A526 sixth comparison data operation part
A527 seventh comparison data operation part
A528 eighth comparison data operation part
A529 ninth comparison data operation part
A52010 10th comparison data operation part
A52011 11th comparison data operation part
A52012 12th comparison data operation part
A52013 13th comparison data operation part
A600 comparison part
A610 comparison operation part
A611 first comparison operation part
A612 second comparison operation part
A613 third comparison operation part
A614 fourth comparison operation part
A615 fifth comparison operation part
A616 sixth comparison operation part
A617 seventh comparison operation part
A618 eighth comparison operation part
A619 ninth comparison operation part
A61010 10th comparison operation part
A61011 11th comparison operation part
A61012 12th comparison operation part
A61013 13th comparison operation part
A620 reference data storage part
A621 first reference data storage part
A622 second reference data storage part
A700 sieve replacing part
A701 first sieve replacing part
A702 second sieve replacing part
A800 final processing part
A810 mixing part
A820 passage
A821 first passage
A822 second passage
A823 confluent passage
A830 flow control part
A831 arrow
A900 storing part
B100 sieve
B110 current sieve
B120 standby sieve
C100 animal excrement disposal material
SA manufacturing method
SA1 first manufacturing method SA2 second manufacturing method
SA3 third manufacturing method
SA4 fourth manufacturing method
SA5 fifth manufacturing method
SAA first granule obtaining step
SAB second granule obtaining step
S100 granulating step
S101 first granulating step
S102 second granulating step
S200 sorting step
S201 first sorting step
S202 second sorting step
S300 quality control step
S301 first quality control step
S302 second quality control step
S303 third quality control step
S400 extracting step
S500 comparison data calculating step
S510 unit numerical value measuring step
S520 comparison data operation step
S521 first comparison data operation step
S522 second comparison data operation step
S523 third comparison data operation step
S524 fourth comparison data operation step
S525 fifth comparison data operation step
S526 sixth comparison data operation step
S527 seventh comparison data operation step
S528 eighth comparison data operation step
S529 ninth comparison data operation step
S52010 10th comparison data operation step
S52011 11th comparison data operation step
S52012 12th comparison data operation step
S52013 13th comparison data operation step
S600 comparing step
S610 comparison operation step
S611 first comparison operation step
S6111 first operation processing
S6112 second operation processing
S612 second comparison operation step
S6121 first operation processing
S6122 second operation processing
S6123 third operation processing
S6124 fourth operation processing
S6125 fifth operation processing
S613 third comparison operation step
S6131 first operation processing
S6132 second operation processing
S6133 third operation processing
S6134 fourth operation processing
S6135 fifth operation processing
S6136 sixth operation processing
S6137 seventh operation processing
S614 fourth comparison operation step
S6141 first operation processing
S6142 second operation processing
S6143 third operation processing
S6144 fourth operation processing
S6145 fifth operation processing
S615 fifth comparison operation step
S6151 first operation processing
S6152 second operation processing
S6153 third operation processing
S6154 fourth operation processing
S6155 fifth operation processing
S6156 sixth operation processing
S6157 seventh operation processing
S616 sixth comparison operation step
S6161 first operation processing
S6162 second operation processing
S617 seventh comparison operation step
S6171 first operation processing
S6172 second operation processing
S6173 third operation processing
S6174 fourth operation processing
S6175 fifth operation processing
S618 eighth comparison operation step
S6181 first operation processing
S6182 second operation processing
S6183 third operation processing
S6184 fourth operation processing
S6185 fifth operation processing
S6186 sixth operation processing
S6187 seventh operation processing
S619 ninth comparison operation step
S6191 first operation processing
S6192 second operation processing
S6193 third operation processing
S6194 fourth operation processing
S6195 fifth operation processing
S61010 10th comparison operation step
S610101 first operation processing
S610102 second operation processing
S610103 third operation processing
S610104 fourth operation processing
S610105 fifth operation processing
S610106 sixth operation processing
S610107 seventh operation processing
S61011 11th comparison operation step
S610111 first operation processing
S610112 second operation processing
S61012 12th comparison operation step
S610121 first operation processing
S610122 second operation processing
S610123 third operation processing
S61013 13th comparison operation step
S610131 first operation processing
S610132 second operation processing
S610133 third operation processing
S610134 fourth operation processing
S610135 fifth operation processing
S700 sieve replacing step
S800 final processing step
S810 mixing step
S830 flow control step
S900 storing step

The invention claimed is:

1. A method of manufacturing animal excrement disposal materials, said method comprising:
 a granulating step of granulating a raw material including pulverizing bentonite into granules,
 a sorting step of sorting the granules with a sieve having a prescribed mesh size to obtain the animal excrement disposal materials,
 a quality control step using quality control equipment, and
 a processing step of processing the animal excrement disposal materials obtained at the sorting step,
 wherein the quality control step includes:
  an extracting step of extracting a sample from the animal excrement disposal materials obtained at the sorting step and not yet processed at the processing step,
  a comparison data calculating step of obtaining a surface area per unit weight of the sample as comparison data, and a sieve replacing step of replacing the sieve based on the comparison data.

2. The method as defined in claim 1, wherein
a prescribed numerical value of the surface area per unit weight is provided as reference data in the quality control step, and
the quality control step further includes a comparing step of comparing the comparison data with the reference data.

3. The method as defined in claim 1, wherein
the sieve includes a current sieve being in use in the sorting step and a standby sieve having a different mesh size from the current sieve, and
the current sieve is replaced with the standby sieve in the sieve replacing step.

4. A method of manufacturing animal excrement disposal materials, said method comprising:
a granulating step of granulating a raw material including pulverizing bentonite into granules,
a sorting step of sorting the granules with a sieve having a prescribed mesh size to obtain the animal excrement disposal materials,
a quality control step using quality control equipment, and
a processing step of processing the animal excrement disposal materials obtained at the sorting step,
wherein the quality control step includes:
    an extracting step of extracting a sample to be measured from the animal excrement disposal materials obtained at the sorting step and not yet processed at the processing step,
    a comparison data calculating step of obtaining a surface area of the sample as comparison data, and
    a sieve replacing step of replacing the sieve based on the comparison data.

5. The method as defined in claim 4, wherein
a prescribed numerical value of the surface area is provided as reference data in the quality control step, and
the quality control step further includes a comparing step of comparing the comparison data with the reference data.

6. The method as defined in claim 4, wherein
the sieve includes a current sieve being in use in the sorting step and a standby sieve having a different mesh size from the current sieve, and
the current sieve is replaced with the standby sieve in the sieve replacing step.

7. The method as defined in claim 1, wherein
the sorting step includes
    a first sorting step by a first current sieve to obtain first animal excrement disposal materials from the granules, and
    a second sorting step by a second current sieve to obtain second animal excrement disposal materials from the granules, the first and second current sieves having different mesh size from each other,
the processing step includes a mixing step of mixing the first and second animal excrement disposal materials obtained respectively in the first and second sorting steps.

8. The method as defined in claim 7, wherein the first sorting step and the second sorting step are simultaneously performed.

9. The method as defined in claim 7, wherein
the mixing step includes
    a flow control step of adjusting a mixing ratio of the first animal excrement disposal materials and the second animal excrement disposal materials, and
    a mixture quality control step of controlling flow rates of the first animal excrement disposal materials and the second animal excrement disposal materials.

10. The method as defined in claim 9, wherein
the flow control step is performed based on a control result in the mixture quality control step.

11. The method as defined in claim 4, wherein
the sorting step includes
    a first sorting step by a first current sieve to obtain first animal excrement disposal materials from the granules, and
    a second sorting step by a second current sieve to obtain second animal excrement disposal materials from the granules, the first and second current sieves having different mesh size from each other,
the processing step includes a mixing step of mixing the first and second animal excrement disposal materials obtained respectively in the first and second sorting steps.

12. The method as defined in claim 11, wherein the first sorting step and the second sorting step are simultaneously performed.

13. The method as defined in claim 11, wherein
the mixing step includes
    a flow control step of adjusting a mixing ratio of the first animal excrement disposal materials and the second animal excrement disposal materials, and
    a mixture quality control step of controlling flow rates of the first animal excrement disposal materials and the second animal excrement disposal materials.

14. The method as defined in claim 13, wherein
the flow control step is performed based on a control result in the mixture quality control step.

* * * * *